(12) United States Patent
Baikalov et al.

(10) Patent No.: US 8,418,229 B2
(45) Date of Patent: Apr. 9, 2013

(54) SYSTEMS AND METHODS FOR PERFORMING ACCESS ENTITLEMENT REVIEWS

(75) Inventors: Igor A. Baikalov, Thousand Oaks, CA (US); Dan P. Antilley, Jr., Fort Mill, SC (US); Jonathan William Deats, Dallas, TX (US); Robert Alan Hansen, Laveen, AZ (US); Peter Jordan Langsam, New York City, NY (US); Cris T. Paltenghe, Spirit Lake, ID (US); Ravi Pritmani, Irving, TX (US); Chadwick R. Renfro, Dallas, TX (US); Carmen M. Warn, Manalapan, NJ (US)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 13/013,694

(22) Filed: Jan. 25, 2011

(65) Prior Publication Data
US 2012/0047575 A1    Feb. 23, 2012

Related U.S. Application Data

(60) Provisional application No. 61/374,482, filed on Aug. 17, 2010.

(51) Int. Cl.
*H04L 29/00* (2006.01)
(52) U.S. Cl. ............ 726/3; 726/4; 726/21; 726/25
(58) Field of Classification Search ............... None
See application file for complete search history.

(56) References Cited

U.S. PATENT DOCUMENTS

| | | | |
|---|---|---|---|
| 8,181,016 B1* | 5/2012 | Borgia et al. | 713/156 |
| 8,285,845 B2* | 10/2012 | Urbanek et al. | 709/224 |
| 2006/0015930 A1* | 1/2006 | Shoham | 726/6 |
| 2006/0143194 A1* | 6/2006 | Stewart et al. | 707/100 |
| 2008/0163347 A1* | 7/2008 | Ratcliff et al. | 726/6 |
| 2008/0288330 A1* | 11/2008 | Hildebrand et al. | 705/10 |

OTHER PUBLICATIONS

Entitlement Reviews: A Practitioner's Guide, 2007, Varonis Systems, pp. 1-16.*
Oracle Identity Analytics User's Guide, Aug. 2010, Oracle, pp. 47-64.*

* cited by examiner

*Primary Examiner* — Minh Dinh
(74) *Attorney, Agent, or Firm* — Michael A. Springs; Moore & Van Allen PLLC; James C. Edwards

(57) ABSTRACT

Embodiments of the invention relate to risk assessments and, more particularly to performing access risk assessments based on identified outliers.

22 Claims, 17 Drawing Sheets

| CLASS 602 | SCORE 604 | DETAILS 606 | MANAGER ACTION 608 |
|---|---|---|---|
| RISK SCORE DETAIL | | XXX | |
| ⊞ ACCESS (11) 618 | 439 | | |
| ⊟ BEHAVIOR (1) 612 | 39 | THREATENING PROXY TRAFFIC (HIT SCORE 440) TO MESSAGING. NONE DATE LOSS PREVENTION ACTIVITY (NON-NPI XFER SCORE 17. NPI XFER SCORE 0)," BUSINESS REASON ON FILE: YES | ASSOCIATE HAS TRAFFIC TO POTENTIALLY THREATENING OF DANGEROUS WEBSITES ASSOCIATE HAS TRANSFERRED DATA TO REMOVABLE MEDIA |
| ⊟ CLASSIFICATION (1) 614 | 4 | REGULATED USER - XXXX | ASSOCIATE HAS INTERNET TRAFFIC TO THREATENING OR POTENTIALLY DANGEROUS WEBSITES |
| ⊟ EXPORT (2) 616 | 4 | XXX DLP EXCEPTION- "THIS LOBRA IS INCLUSIVE OF JOB FUNCTIONS PERFORMED THROUGHOUT SEVERAL GROUPS ACROSS ALL OF GLOBAL CORPORATE BANKING. THE FUNCTIONS INCLUDE SALES, CLIENT MANAGEMENT. PRODUCT DELIVERY, PRODUCT CONSULTANT, COMMUNICATIONS AND OTHER CLIENT FACING AND CLIENT SUPPORT ROLES. IN PERFORMING THESE ROLES THESE ASSOCIATES ROUTINELY WORK WITH LARGE POWERPOINT PRESENTATIONS, EXCEL SPREADSHEETS, WORD DOCUMENTS, PROJECT PLANS AND VARIOUS REPORT TYPES. THE CONTENT OF THE FILES INCLUDES PLA | ASSOCIATE HAS INTERNET TRAFFIC TO THREATENING OR POTENTIALLY DANGEROUS WEBSITES |
| | | XXX WEBMAIL EXCEPTION | ASSOCIATE HAS INTERNET TRAFFIC TO THREATENING OR POTENTIALLY DANGEROUS WEBSITES |

FIG. 11

| CLASS | SCORE | DETAILS | MANAGER ACTION |
|---|---|---|---|
| ⊞ ACCESS (11) | 439 | | |
| | | MAINFRAME - DALLAS PRODUCTION [1G01] | INFORMATION MANAGEMENT SYSTEM<br>ENCORE + G/F--APPROVERS: NAME(S) |
| | | MAINFRAME - DALLAS TEST [1J01] | ACCOUNT ANALYSIS<br>ACCOUNT ANALYSIS CICS TRANS<br>CICSTEST KEY02 |
| | | CASHPRO ONLINE AIT#11697 [CPO] | TRUST INFORMATION<br>SUPPORT - CHAT |
| | | NEWS-MSG AIT#6784 [NEWS] | ADMINISTRATOR FOR NEWS GROUP: XXXX<br>AND LIQUIDIT |
| | | BAD ACCOUNT TRANSFER [AT] | AT: INQUIRE ON A TRANSFER<br>AT INITIATE A TRANSFER, APPROVAL NOT REQUIRED |
| | | BAD ACH [ACH1] | ACH: ACH ONLINE<br>ACH: ACH PASSTHRU |
| | | BAD POSITIVE PAY [PPY] | PPY: INITIATE DECISION<br>PPY: MONDIFY DECISION |
| | | BAD STOP PAY [STOP] | STOP: INQUIRE ON A STOP<br>STOP: INITIATE A STOP<br>STOP: INQUIRE ON A PAID ITEM<br>STOP: DELETE A CANCEL<br>STOP: INITIATE A CANCEL |
| | | VIEW DIRECT REPORTS [VIEWDIRECT] | GFINFO |
| | | BAD IMAGE ACCESS [IA] | IA VIEW |
| | | WINDOWS 2000/XP [CORP] | ACCESS TO \\NETWORK ADDRESS |
| ⊞ BEHAVIOR (1) | 39 | | |
| | | THREATENING PROXY TRAFFIC (HIT SCORE 440) TO: MESSAGING, NONE DATA LOSS PREVENTION ACTIVITY (NON-NPI Xfer SCORE 17. NPI Xfer SCORE 0),,, BUSINESS REASON ON FILES: YES | ASSOCIATE HAS TRAFFIC TO POTENTIALLY THREATENING OR DANGEROUS WEBSITES<br>ASSOCIATE HAS TRANSFERRED DATA TO REMOVABLE MEDIA |
| ⊞ CLASSIFICATION (1) | 4 | | |

FIG. 12

SYSTEMS AND METHODS FOR PERFORMING ACCESS ENTITLEMENT REVIEWS

FIELD

In general, embodiments of the invention relate to risk assessments and, more particularly, relate to performing access entitlement reviews based on identified risk outliers.

BACKGROUND

Access entitlements are permissions granted at various levels within an entity, such as a corporate enterprise or the like, to allow an individual, such as an employee to perform a given type of task. Depending on the entity granting the access entitlements and the individuals to whom the access entitlements are granted, the permissions can be at a highly granular level. For example, a user/employee may have read-only access entitlement to a specific document and/or the user/employee may have read and write access to another specific document.

In addition, access entitlements can be grouped into hierarchies based on groups and assigned to roles. For example, a specific employee role is granted read-only access entitlement to a specific document and/or read and write access entitlement to another document. Members of the specific employee group have the specific employee role and all members of the group may have group-wide access entitlements and/or all employees having the same role may have role-wide access entitlements. The use of such roles makes individual entitlements easier to manage since a large collection of granular entitlements can be associated to a role. Groups are then assigned to the role, and finally employees are given membership to the groups. Simply by adding an employee to a group will grant that employee all of the entitlements necessary to perform the functions of the role.

Some job functions may have many roles that are necessary to perform the duties of the job. Additionally, access to multiple computers, shared folders, network domains, etc. may be necessary. To make the on-boarding of new or transferred employees more manageable, many on-boarding procedures have been automated, such that large number of access entitlements that have been pre-defined by a job function may be granted to the new or transferred employee.

Over time, a given employee can acquire a large number of access entitlements by changing job capacities if the original entitlements granted to the employee are not cancelled, referred to herein as "de-provisioned". Although de-provisioning entitlements when the access is no longer generally required is an industry best practice, the fact that there is a strong correlation with length of employment and the number of entitlements outstanding indicates that current de-provisioning procedures are highly ineffective.

In large corporations, the ineffectiveness of de-provisioning procedures, are due, at least in part, to the reality that the correlation between job functions, roles to support functions, entitlements to support roles, and the relationships to an employee's current job requirements are typically poorly maintained. This disconnect in the de-provision practices is primarily due to the sheer scale of the number of access entitlement applications, the age of the access entitlement applications, the disparate platforms and the manner in which the platforms maintain entitlements, disconnection between on-boarding and de-provisioning systems, and the velocity of change imposed on all of the factors results in a problem that is very difficult to retroactively resolve.

Access entitlement reviews need to be performed within enterprises on a regular basis to ensure employees have access to what they need to perform their job functions, but no more access than is necessary. Such access reviews serve to reduce the risk of possible inappropriate usage. In certain regulated industries access entitlement reviews, conducted on a regular basis, are not only an industry best practice; such reviews are now required by government policy and regulators, such as Sarbanes-Oxley and the like.

In the past access reviews have been scheduled on a calendar basis. Most best-practice frameworks, such as Control Objectives for Information and related Technologies (COBIT) or the like, recommend that access entitlement reviews be conducted on a regularly scheduled basis, the frequency of which depends on the nature of the entitlements. Entitlements that represent a greater risk, such as those that allow employees to view customer or third party identities, should be reviewed more frequently, while lower risk entitlements, such as those that provide employees access to the corporate network, may be reviewed less frequently. However, calendar or other cyclic regularly scheduled reviews tend to be arbitrary and have no correlation to when risk conditions occur.

Unfortunately, many access entitlements are not classified by risk, and, therefore, conducting such access reviews based on risks becomes problematic. Further, because of the issues discussed previously, it is usually not even possible to conduct access reviews by job title, job functions or roles because the association to these higher level groupings does not exist or no longer exists.

Traditionally, access reviews have resulted in an attempt to review all of the entitlements for all of the employees. In an enterprise scenario, such an exhaustive review puts an impractical amount of work and responsibility on the managers of the employees. In addition, poor effectiveness and efficiency of the access reviews can be attributed to the scale of entitlements granted within an enterprise. Moreover, due to inadequate information describing the entitlements, the managers do not readily understand the nature of the entitlements, or the implications of de-provisioning the entitlements. In this regard, managers all too often continue to provide perfunctory approvals of entitlements rather than take the risk of disabling important functions that may negatively impact their staff.

In addition, access entitlement reviews and, specifically the goal of risk reduction, provide for difficulty in terms of quantitative measurement and demonstration.

Therefore, a need exists to develop systems and method for access entitlement reviews that demonstrate and measure a reduction in risk. In addition, the desired access entitlement review system and methods should reduce the workload of managers or other individuals typically tasked with conducting such reviews. Additionally, the desired systems and methods should increase effectiveness of the reviews as evidenced by the percentage of access reviews completed and improved reduction of risk by higher revocation percentages versus traditional reviews. Moreover, the desired access entitlement review systems and methods should increase efficiency by reviewing only those entitlements that represent the most risk.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Thus, further details are provided below for performing risk assessments and, in particular, a flexible, continuously monitored and scalable access entitlement review model. In specific embodiments of the invention the access entitlement review model is based on access risk scoring of employees in an enterprise and focusing on outliers identified by inappropriate access, past behavior and/or export capability.

A method for access entitlement review defines first embodiments of the invention. The method includes determining one or more entitlement review candidates from amongst a plurality of associates associated with an entity. The method further includes providing a listing of one or more access entitlements associated with each of the one or more entitlement review candidates, receiving one of a justification input or a revocation input for each of the one or more access entitlements and providing for revocation of one or more of the access entitlements based on the revocation input.

In specific embodiments of the method, providing the listing of the one or more access entitlements further includes providing a network-accessible viewable display of the listing of the one or more access entitlements.

In further specific embodiments of the method, providing the listing of the one or more access entitlements further includes providing the listing of the one or more access entitlements to an associated entitlement review candidate for self-review. In such embodiments, providing the listing of the one or more outlier access entitlements further includes providing the listing of the one or more outlier access entitlements to a manager of the associated entitlement review candidate. Moreover, in such embodiments, receiving further includes receiving, from the manager, one of the justification input or the revocation input for each of the one or more access entitlements, wherein the justification inputs and revocation inputs are at least partially based on access entitlement responses from the associated entitlement review candidate.

On other specific embodiments of the method, providing the listing of the one or more access entitlements further includes providing the listing of the one or more access entitlements to an entitlement review facilitator. In such embodiments, receiving further includes receiving, from the entitlement review facilitator, one of the justification input or the revocation input for each of the one or more access entitlements.

In still further embodiments of the method, providing for revocation further comprises providing a revocation notification to a revocation facilitator, wherein the revocation notification lists the access entitlements to be revoked.

In further specific embodiments of the method, determining the one or more risk review candidates further includes determining one or more normalized risk scores for the plurality of associates and comparing the normalized risk scores to predetermined normalized risk score thresholds, wherein each of the one or more normalized risk scores are associated with a risk category. In such embodiments of the method, determining the one or more normalized risk scores may further include determining community averages and community standard deviations for each community within two or more predetermined community categories based on one or more raw risk scores and determining the one or more normalized risk scores based on the raw risk scores, the community averages and the community standard deviation. In further such embodiments of the method, determining the one or more risk review candidates may further include determining one or more outlier reinforcement scores and comparing the outlier reinforcement scores to predetermined outlier reinforcement score thresholds. In such embodiments of the method, determining the one or more outlier reinforcement scores may further include summing positive-valued normalized risk scores within a community to result in an overall community score and summing the overall community scores from two or more community categories to result in the outlier reinforcement score.

An alternate method for access entitlement review defines second embodiments of the invention. The method includes communicating a self-entitlement review notification to an associate requiring entitlement review and communicating an entitlement review notification to a manager of the associate requiring entitlement review. The method further includes providing the manager with access to self-entitlement review responses inputted by the associate and receiving, from the manager, entitlement review responses, wherein the entitlement review responses are based at least in part on the self-entitlement review responses. The method further includes storing the entitlement review responses in an entitlement review queue.

In specific embodiments the method further includes communicating, via a computing device processor, an entitlement review notification to an entitlement review facilitator, in lieu of communicating the self-entitlement review notification to the associate and the entitlement review notification to the manager. In such embodiments, receiving further includes receiving, from the entitlement review facilitator, the entitlement review responses, wherein the entitlement review responses received from the entitlement review facilitator are in lieu of entitlement review responses received from the manager.

An apparatus for access entitlement review defines third embodiments of the invention. The apparatus includes a computing platform including a memory and at least processor in communication with the memory. The apparatus further includes an entitlement review candidate determining module stored in the memory, executable by the processor and configured to determine one or more entitlement review candidates from amongst a plurality of associates. The apparatus further includes an access entitlement review module stored in the memory, executable by the processor. The access entitlement review module includes an access entitlement review application configured to provide for a listing of a one or more access entitlements associated with each of the one or more entitlement review candidates and receive one of a justification input or a revocation input for each of the one or more access entitlements. The access entitlement review module further includes an access entitlement review queue configured to store the justification inputs and revocations inputs as review results for the entitlement review candidates.

In further embodiments of the apparatus, the access entitlement review application is further configured to provide a network-accessible viewable display of the listing of the one or more access entitlements.

In other embodiments of the apparatus, the access entitlement review application is further configured to provide the listing of the one or more access entitlements to the associated entitlement review candidate for self-review. In related embodiments of the apparatus, the access entitlement review application is further configured to provide the listing of the one or more access entitlements to a manager of the associated entitlement review candidate. In such embodiments of the apparatus, the access entitlement review application is further configured to receive, from the manager, one of a justification input or a revocation input for each of the one or more access entitlements, wherein the justification inputs and revocation inputs are at least partially based on access entitlement responses from the associated entitlement review candidate.

In further embodiments of the apparatus, the access entitlement review application is further configured to provide the listing of the one or more access entitlements to an entitlement review facilitator. In such embodiments of the apparatus, the access entitlement review application is further configured to receive, from the entitlement review facilitator, one of the justification input or the revocation input for each of the one or more access entitlements.

In other specific embodiments the apparatus includes an access entitlement revocation routine configured to provide a revocation notification to a revocation facilitator, wherein the revocation notification includes a list of the access entitlements requiring revocation.

In still further specific embodiments of the apparatus, the entitlement review candidate determining module is further configured to determine one or more normalized risk scores for the plurality of employees and compare the normalized risk scores to predetermined normalized risk score thresholds to determine the entitlement review candidates, wherein each of the one or more normalized risk scores are associated with a risk category. In such the entitlement review candidate determining module may be further configured to determine community averages and community standard deviations for each community within two or more predetermined community categories based on one or more raw risk scores and determine the one or more normalized risk scores based on the raw risk scores, the community averages and the community standard deviations. In further such embodiments, the entitlement review candidate determining module may be further configured to determine one or more outlier reinforcement scores and compare the outlier reinforcement scores to predetermined outlier reinforcement score thresholds to determine the entitlement review candidates. In such embodiments of the apparatus, the entitlement review candidate determining module is further configured to sum positive-valued normalized risk scores within a community to result in an overall community score and sum the overall community scores from two or more community categories to result in the outlier reinforcement score.

An alternate apparatus for access entitlement review provides for fourth embodiments of the invention. The apparatus includes a computing platform including a memory and at least processor in communication with the memory. The apparatus further includes an access entitlement review module stored in the memory, executable by the processor. The module includes an access entitlement review application configured to communicate a self-entitlement review notification to an associate requiring entitlement review and an entitlement review notification to a manger of the associate and receive entitlement review responses from the manager. The module additionally includes an access entitlement review interface application configured to provide the manager with access to self-assessment review responses inputted by the associate, such that the entitlement review responses received from the manager are based at least in part on the self-entitlement. The module further includes an access entitlement review queue configured to store the entitlement review responses.

In specific embodiments of the apparatus, the access entitlement review application is further configured to communicate an entitlement review notification to an entitlement review facilitator. In such embodiments of the apparatus, the access entitlement review application is further configured to communicate the entitlement review notification to an entitlement review facilitator in lieu of communicating the self-entitlement review notification to the associate and the entitlement review notification to the manager.

A computer program product including a non-transitory computer-readable medium defines fifth embodiments of the invention. The computer-readable medium includes a first set of codes for causing a computer to determine one or more entitlement review candidates from amongst a plurality of associates associated with an entity. The computer-readable medium also includes a second set of codes for causing a computer to provide a listing of one or more access entitlements associated with each of the one or more entitlement review candidates and a third set of codes for causing a computer to receive one of a justification input or a revocation input for each of the one or more access entitlements. Additionally, the computer-readable medium includes a fourth set of codes for causing a computer to store in an access entitlement review queue the justification inputs and revocation inputs as access entitlement review results.

Another computer program product including a non-transitory computer-readable medium defines sixth embodiments of the invention. The computer-readable medium includes a first set of codes for causing a computer to communicate a self-entitlement review notification to an associate requiring entitlement review and a second set of codes for causing a computer to communicate an entitlement review notification to a manager of the associate requiring entitlement review. In addition, the computer-readable medium includes a third set of codes for causing a computer to provide the manager with access to self-entitlement review responses inputted by the associate. Additionally, the computer-readable medium includes a fourth set of codes for causing a computer to receive, from the manager, entitlement review responses, wherein the entitlement review responses are based at least in part on the self-entitlement review responses and a fifth set of codes for causing a computer to store the entitlement review responses in an entitlement review queue.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
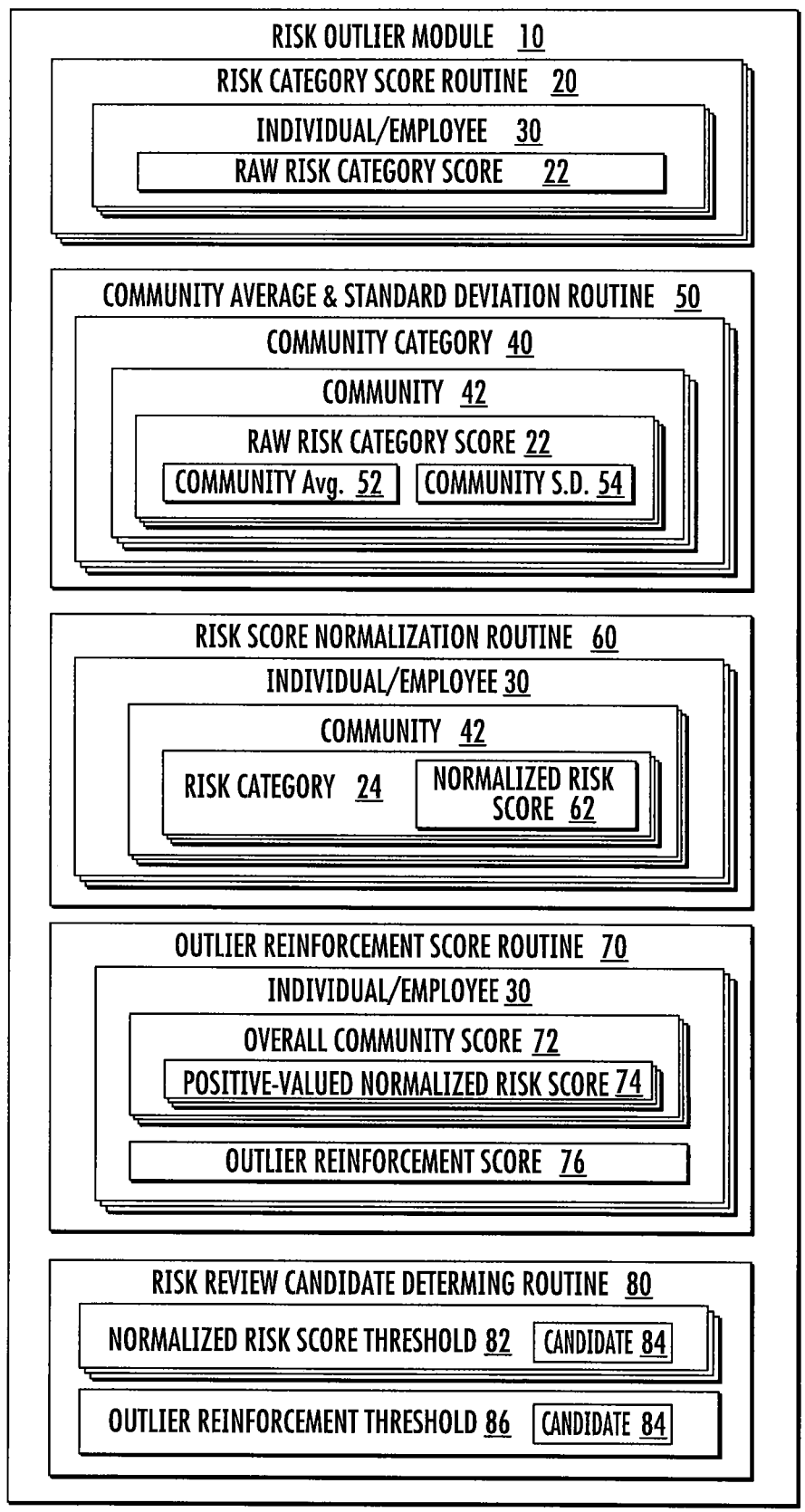
Figure 2:
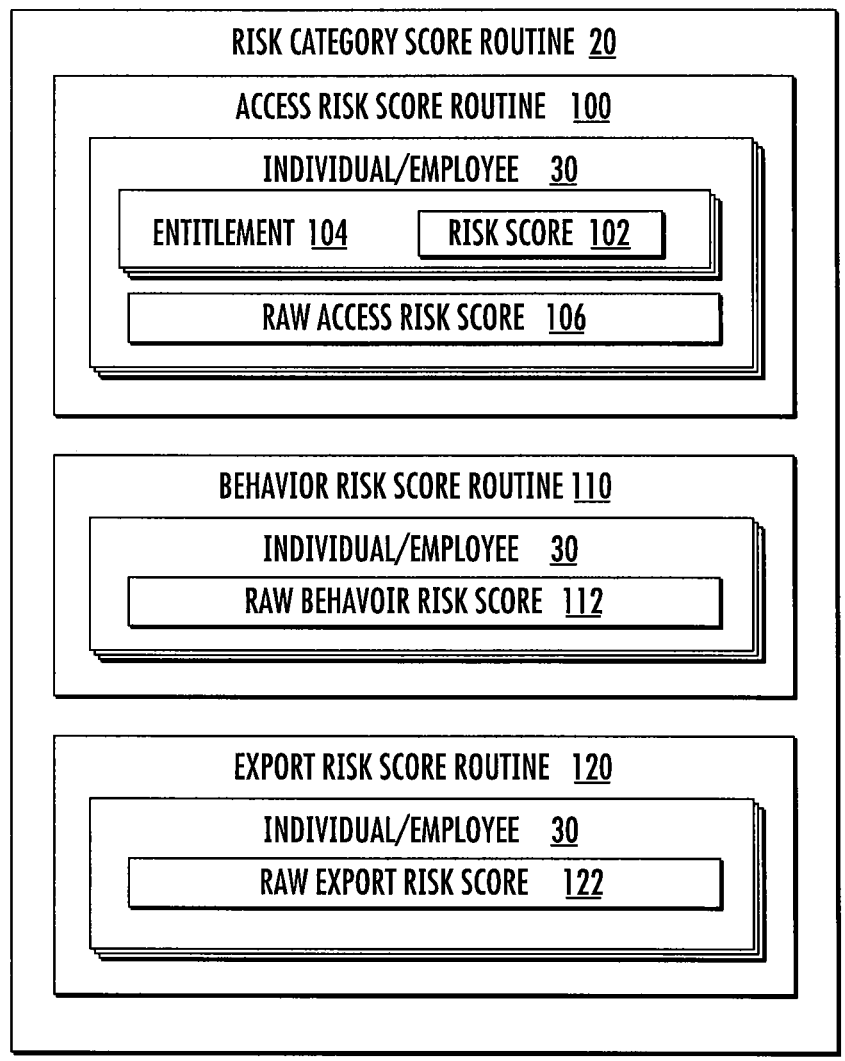
Figure 3:
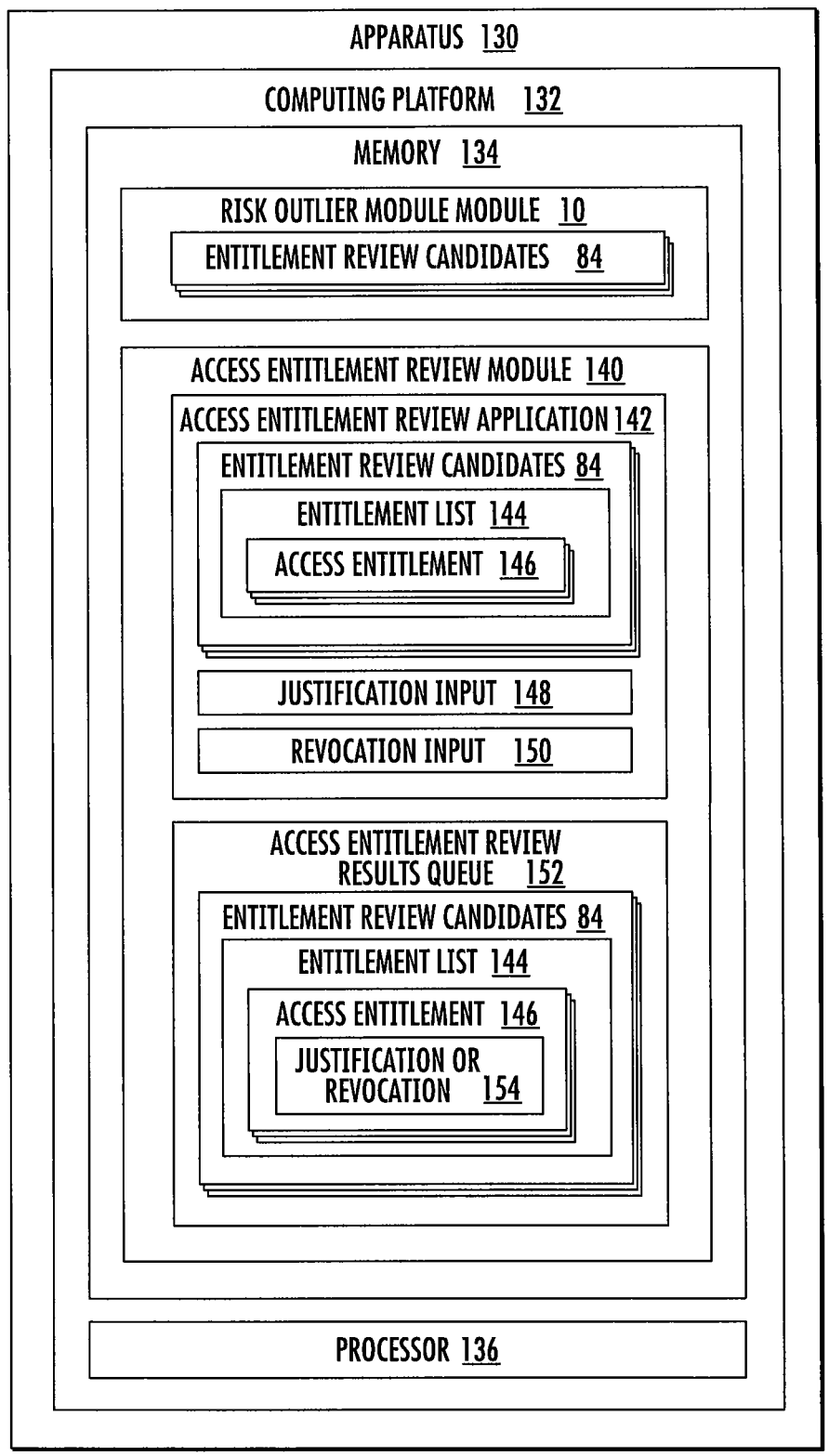
Figure 4:
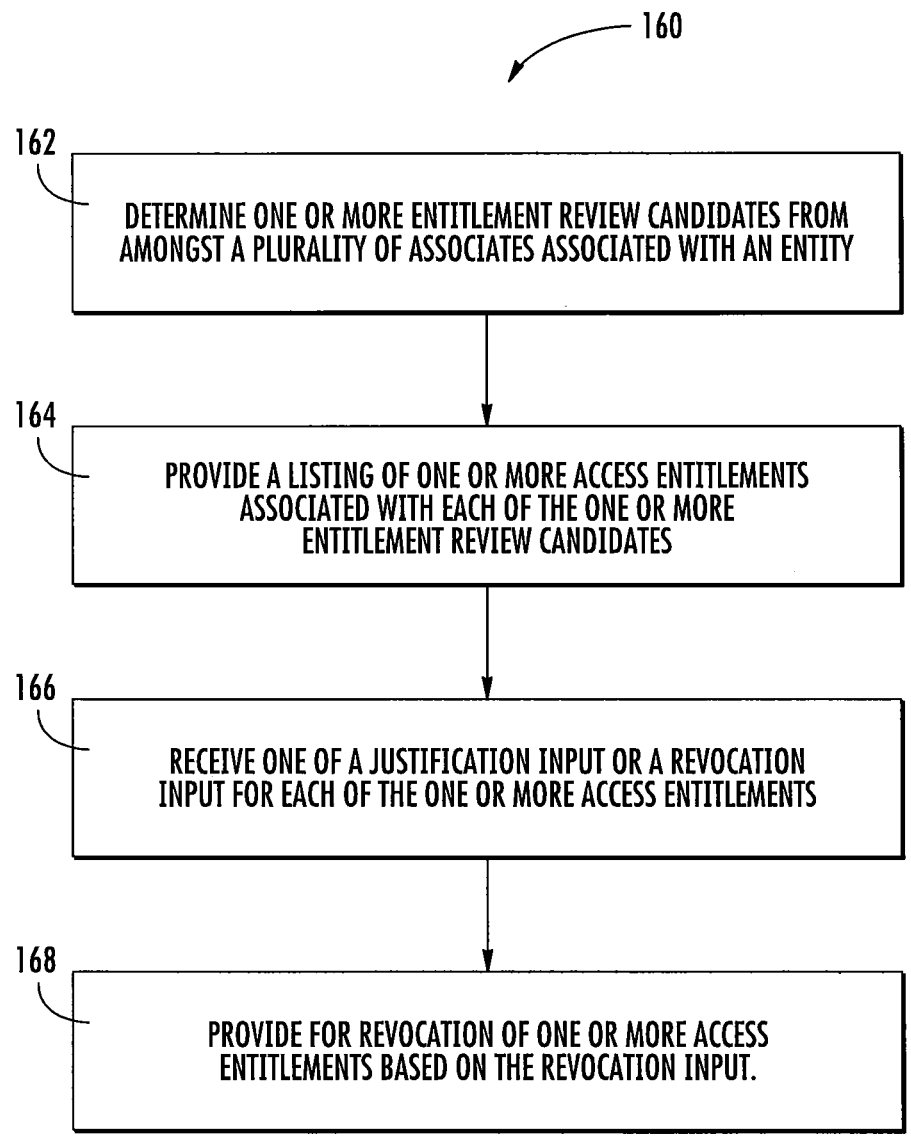
Figure 5:
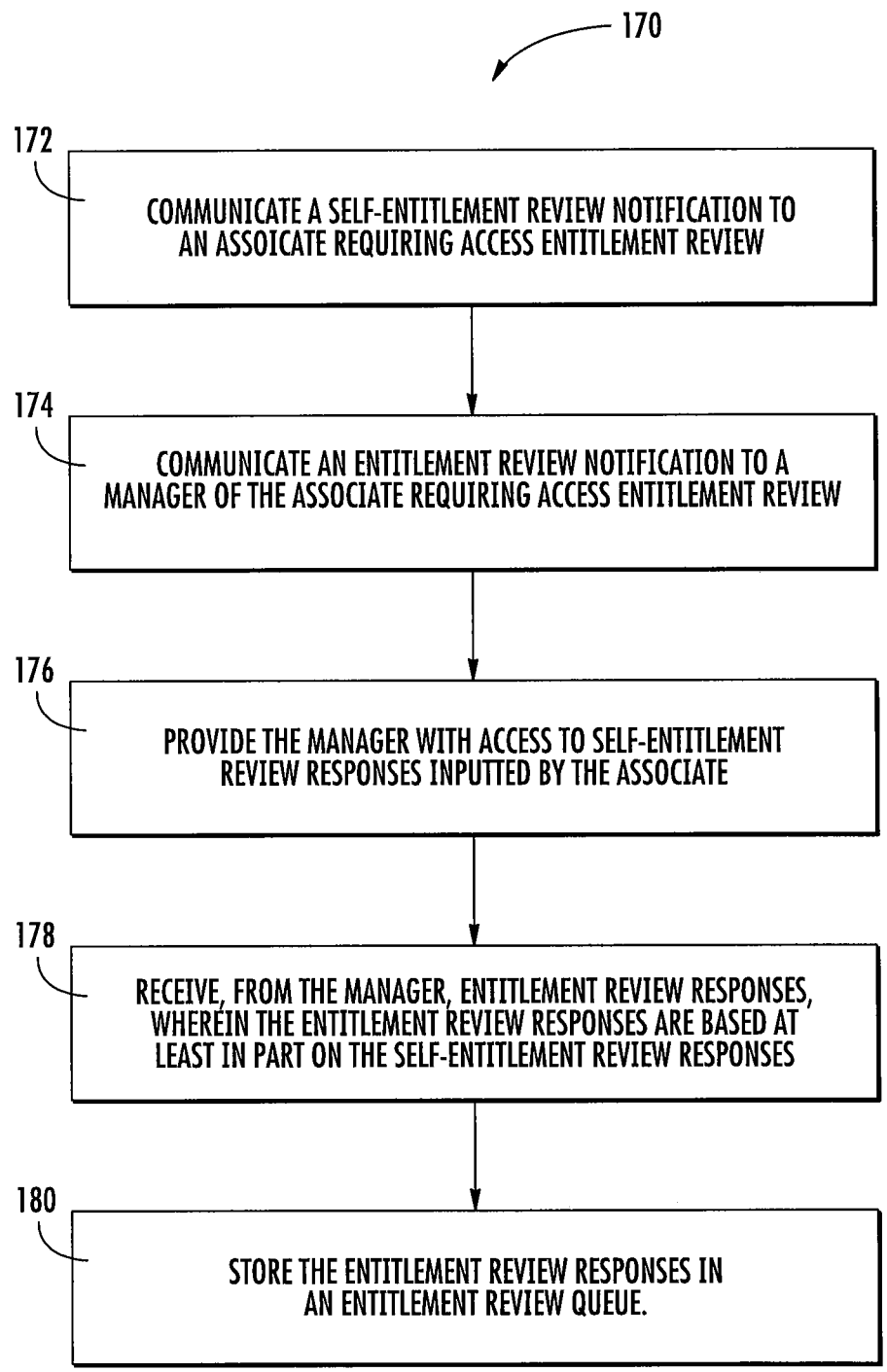
Figure 6:
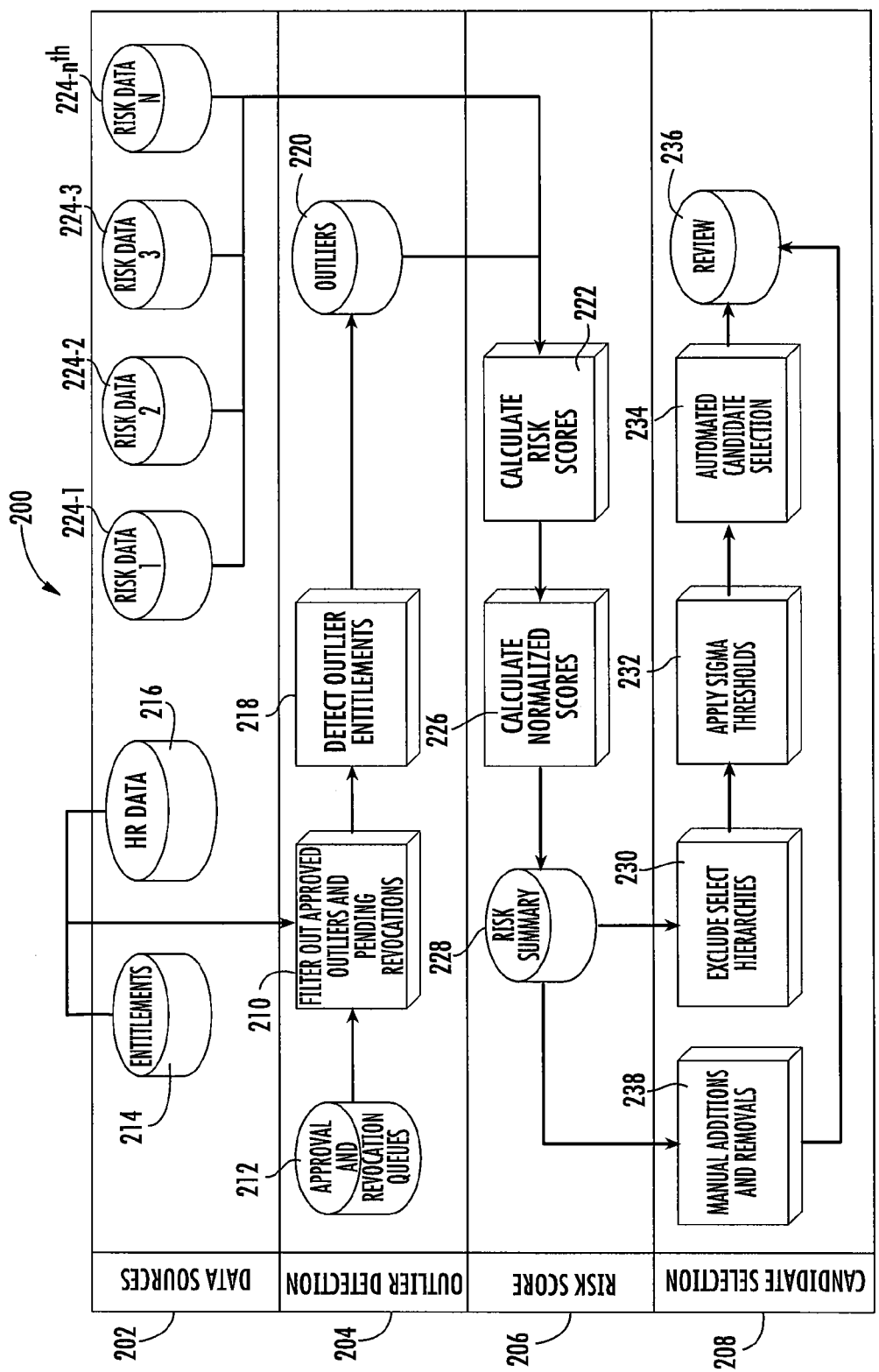
Figure 7:
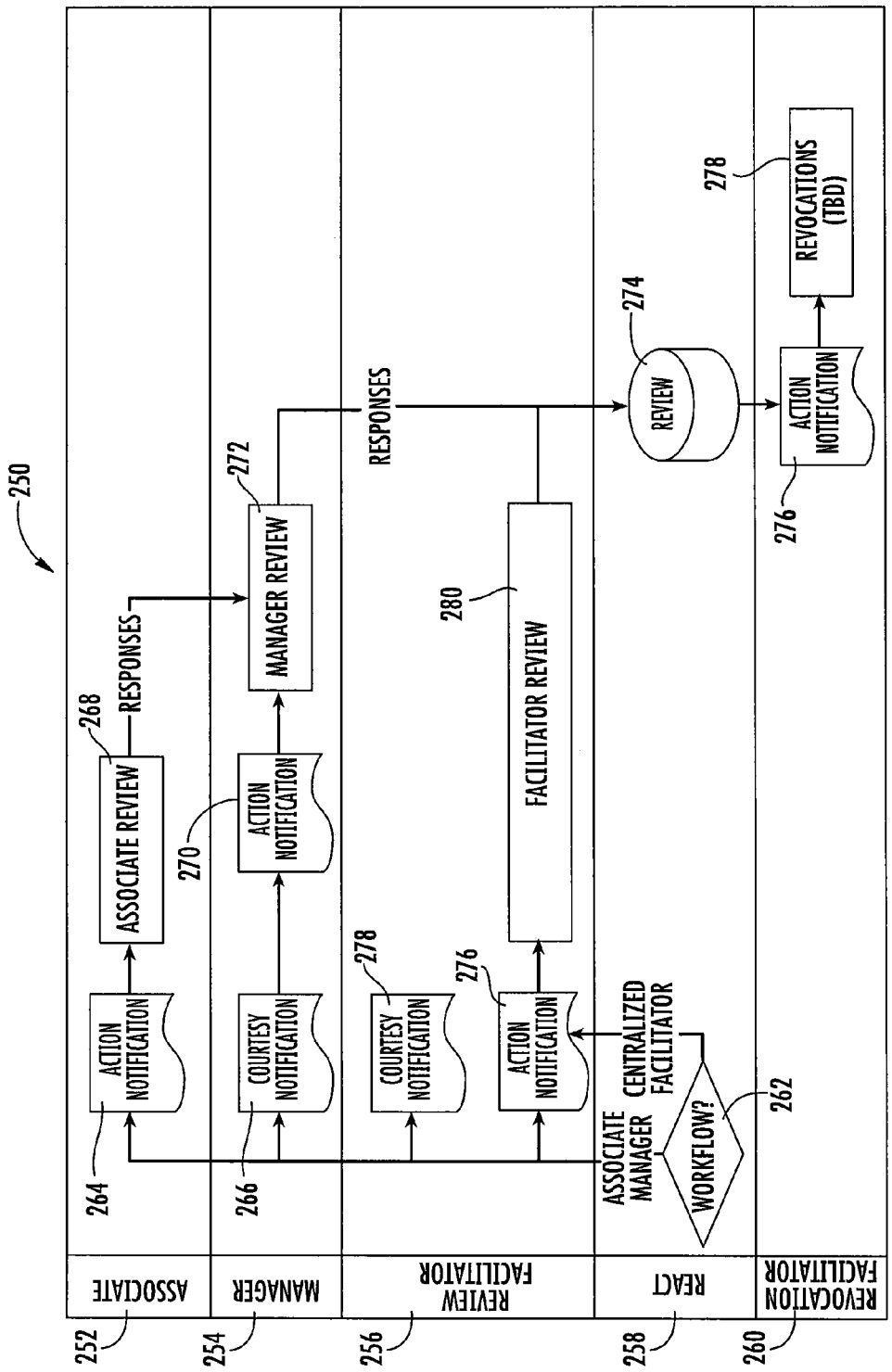
Figure 8:
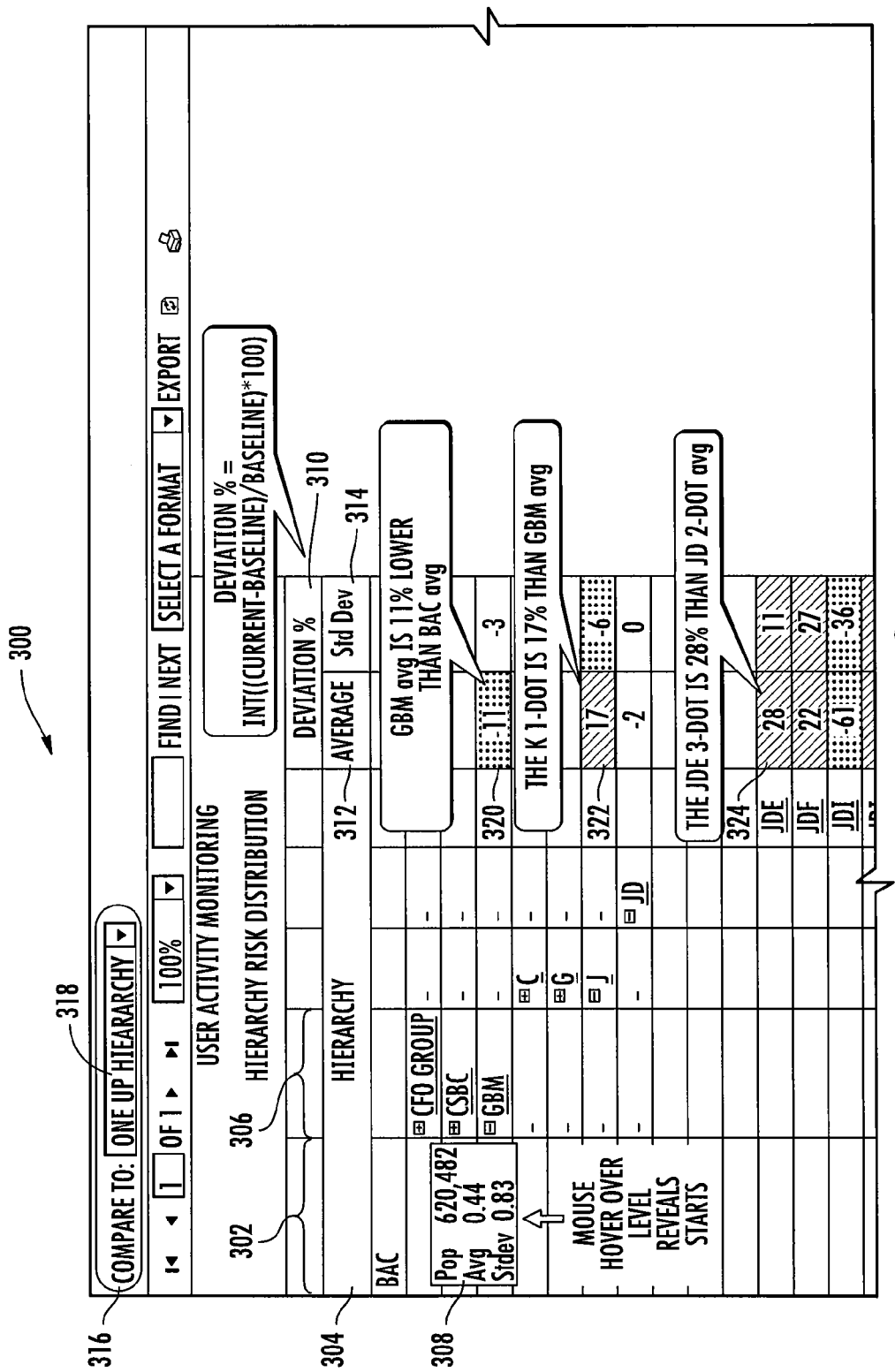
Figure 9:
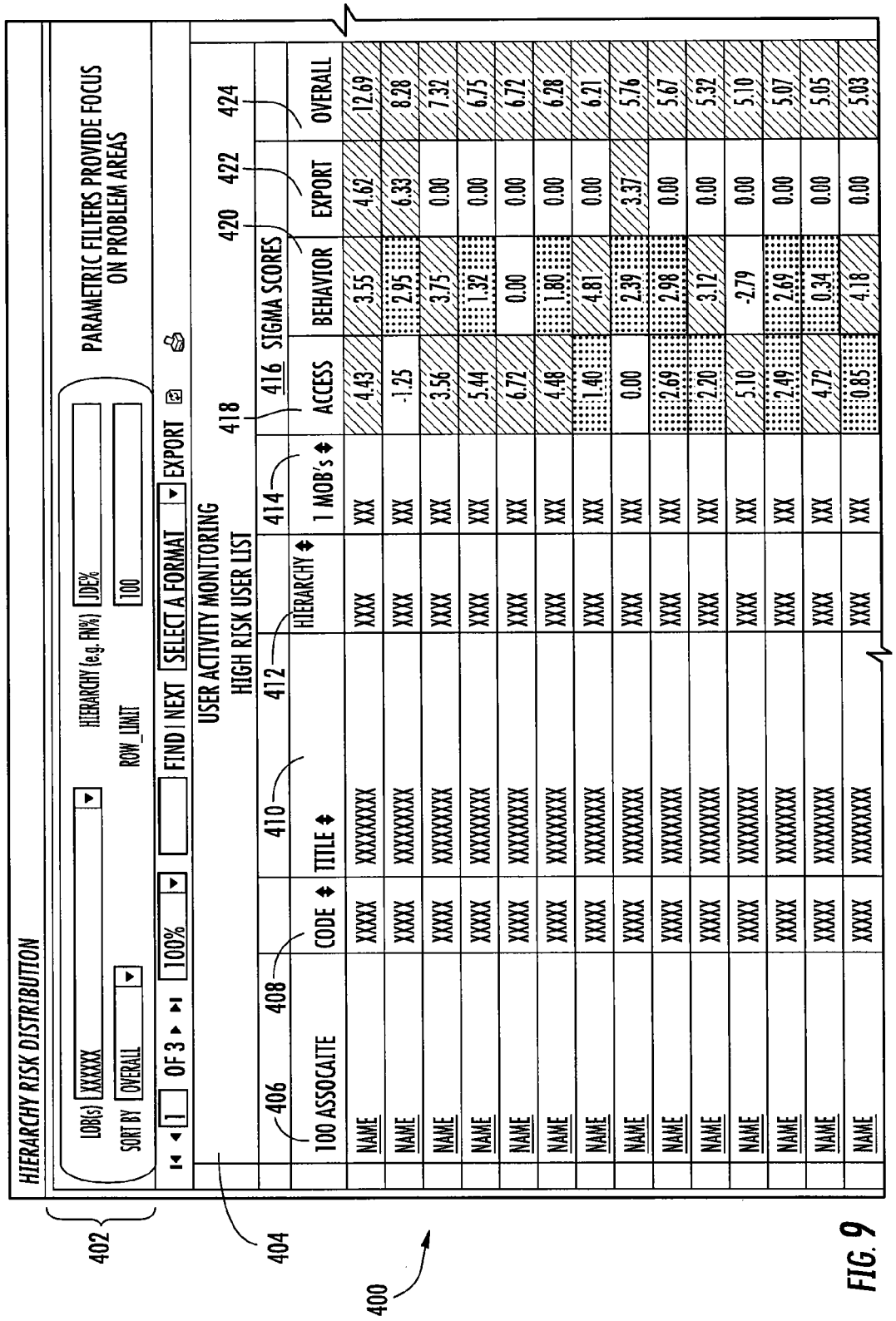
Figure 10:
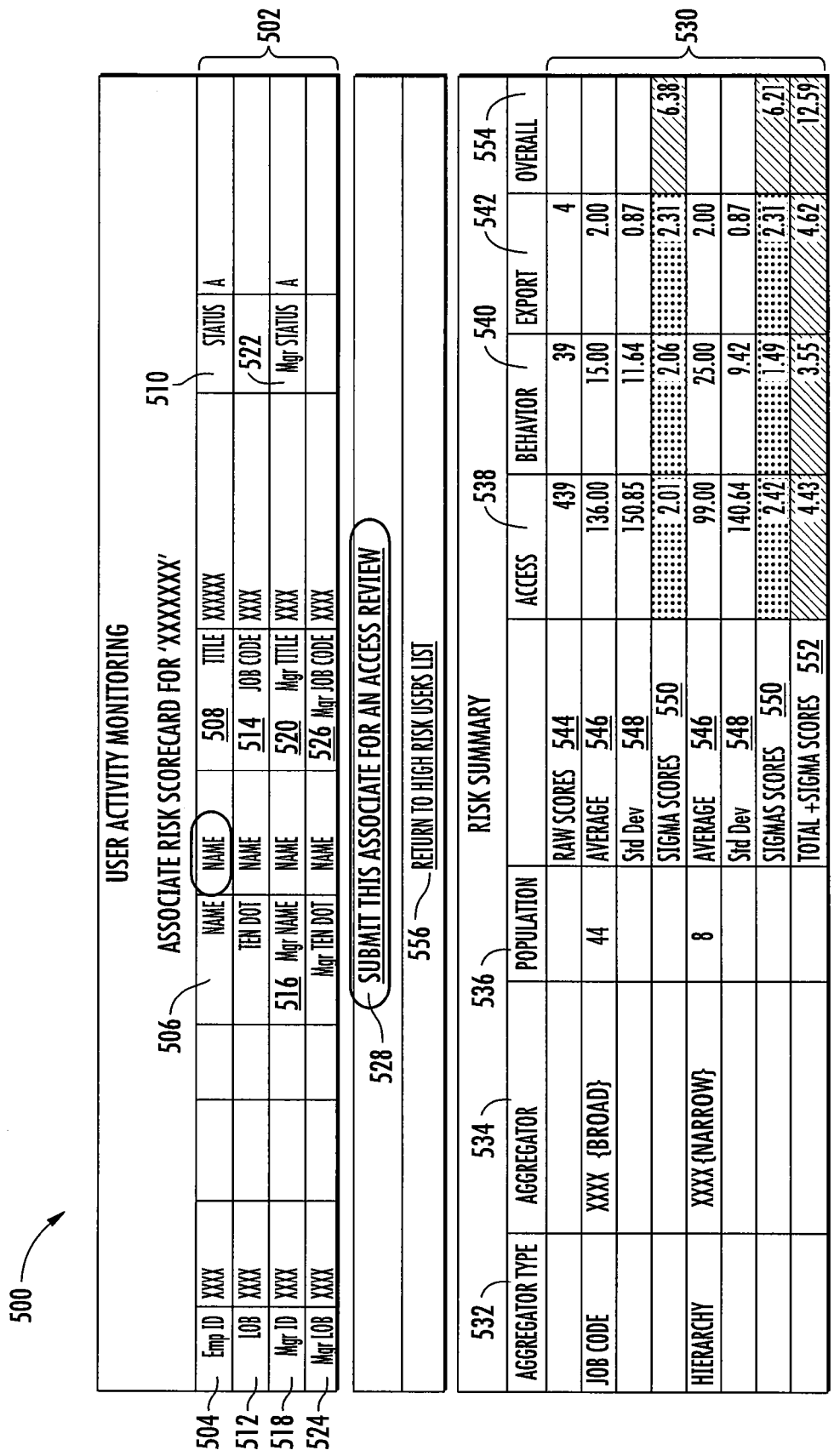
Figure 13:
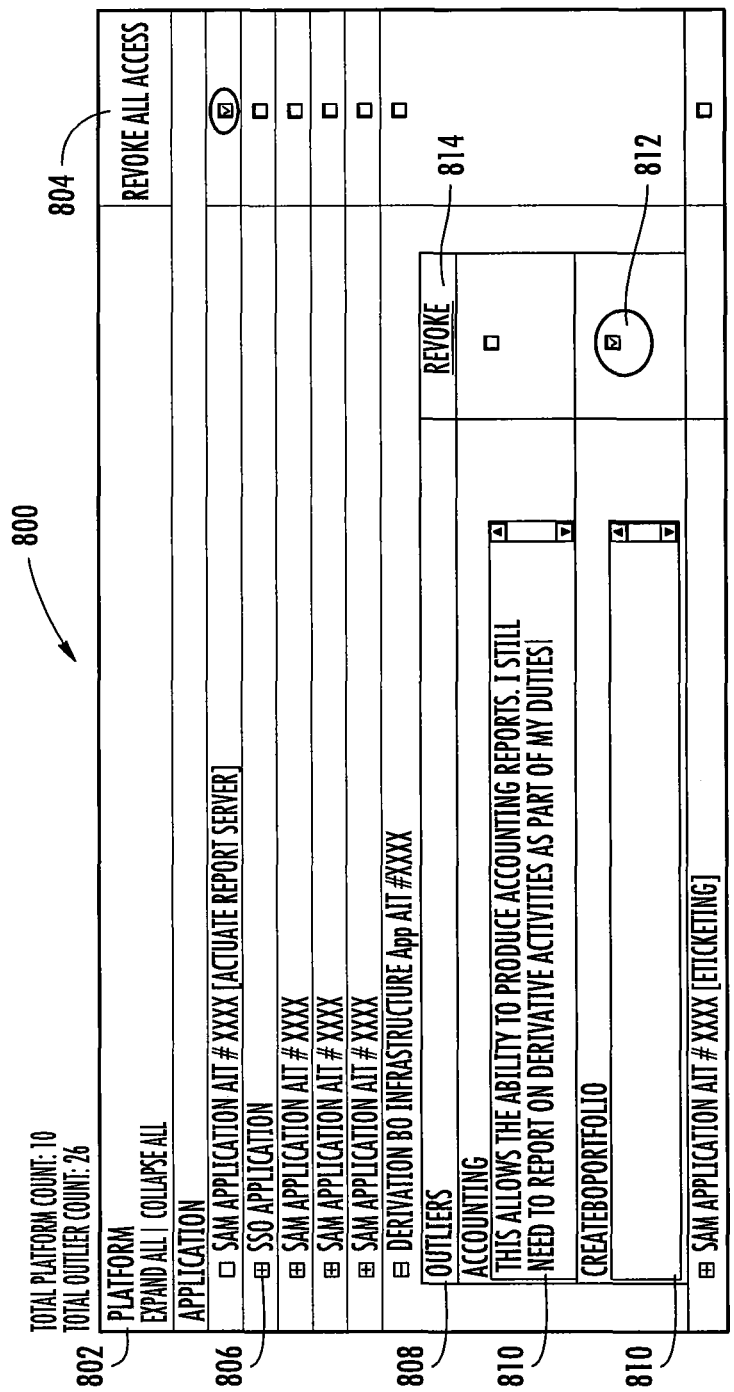
Figure 14:
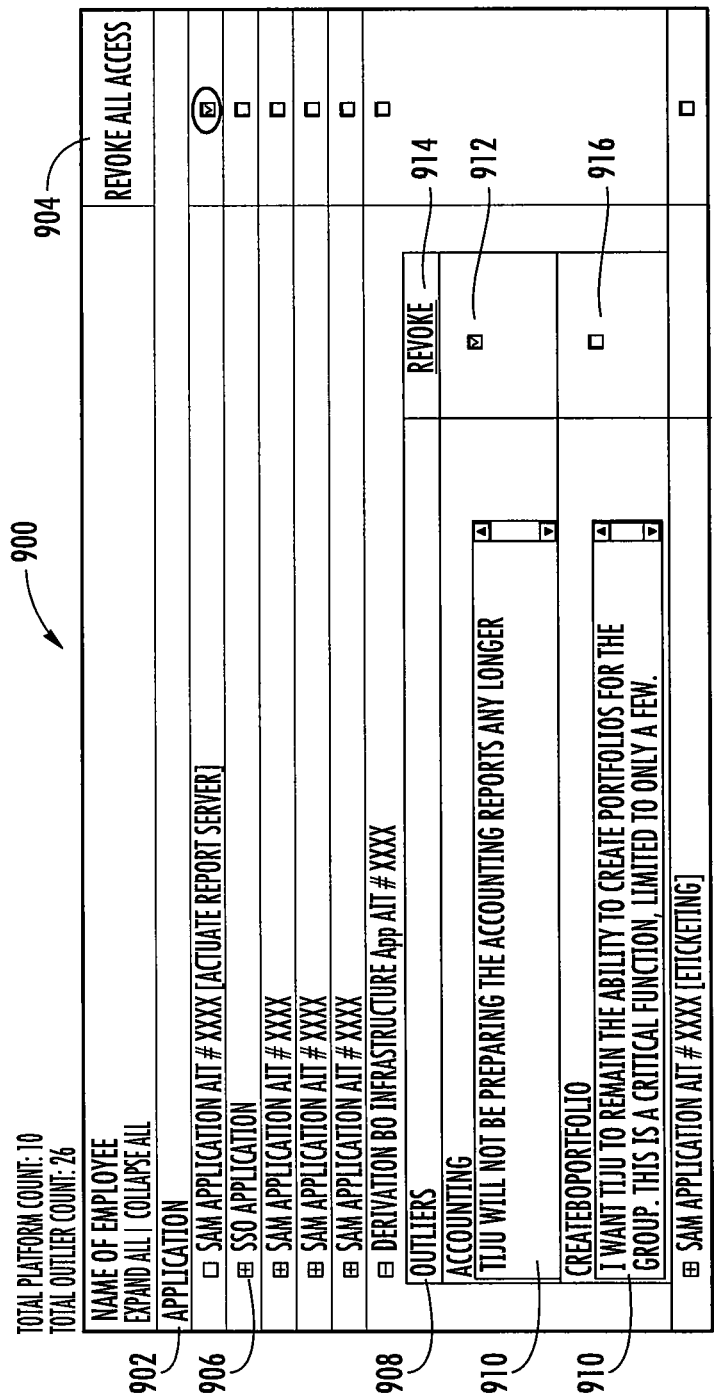
Figure 15:
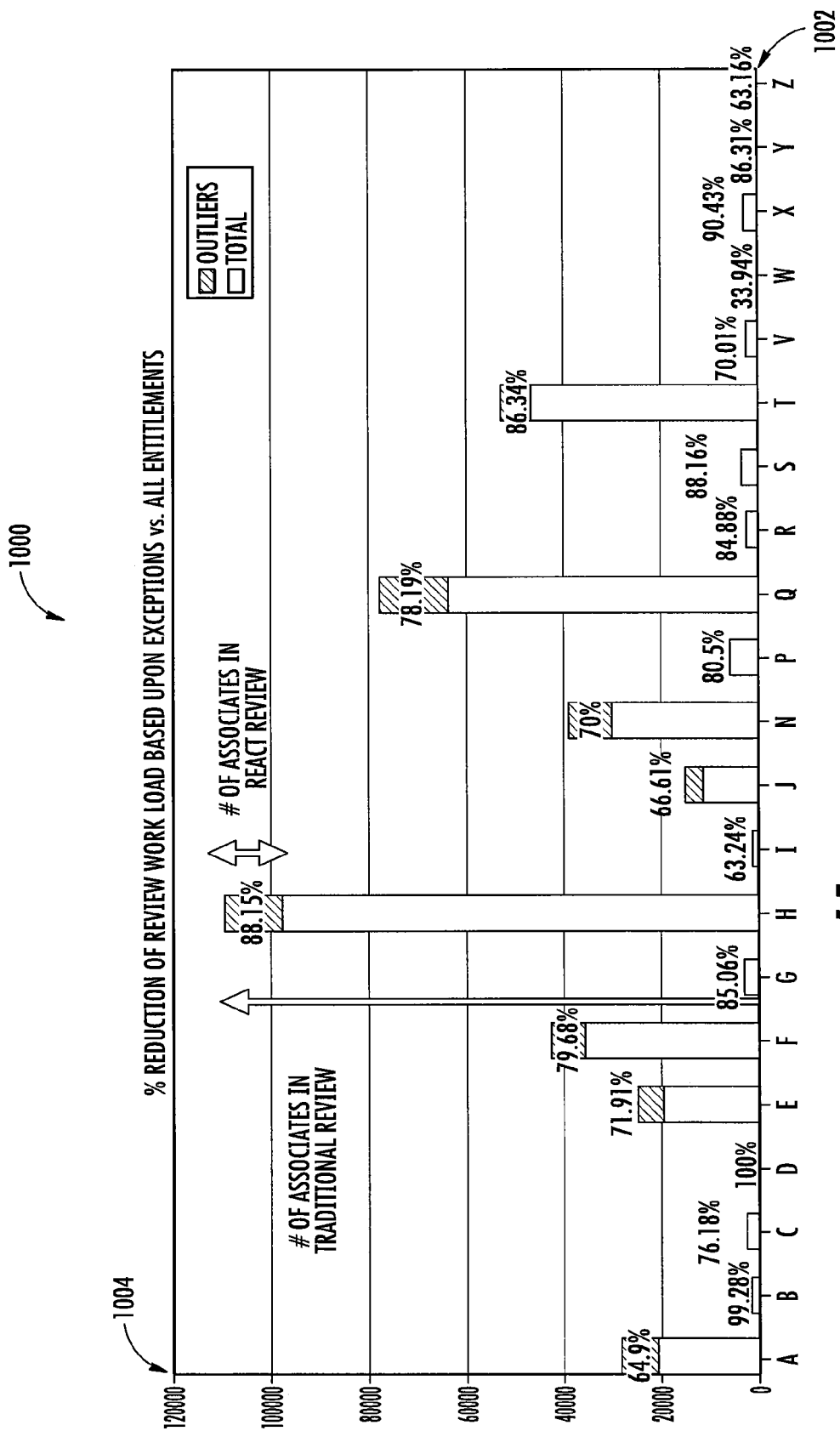
Figure 16:
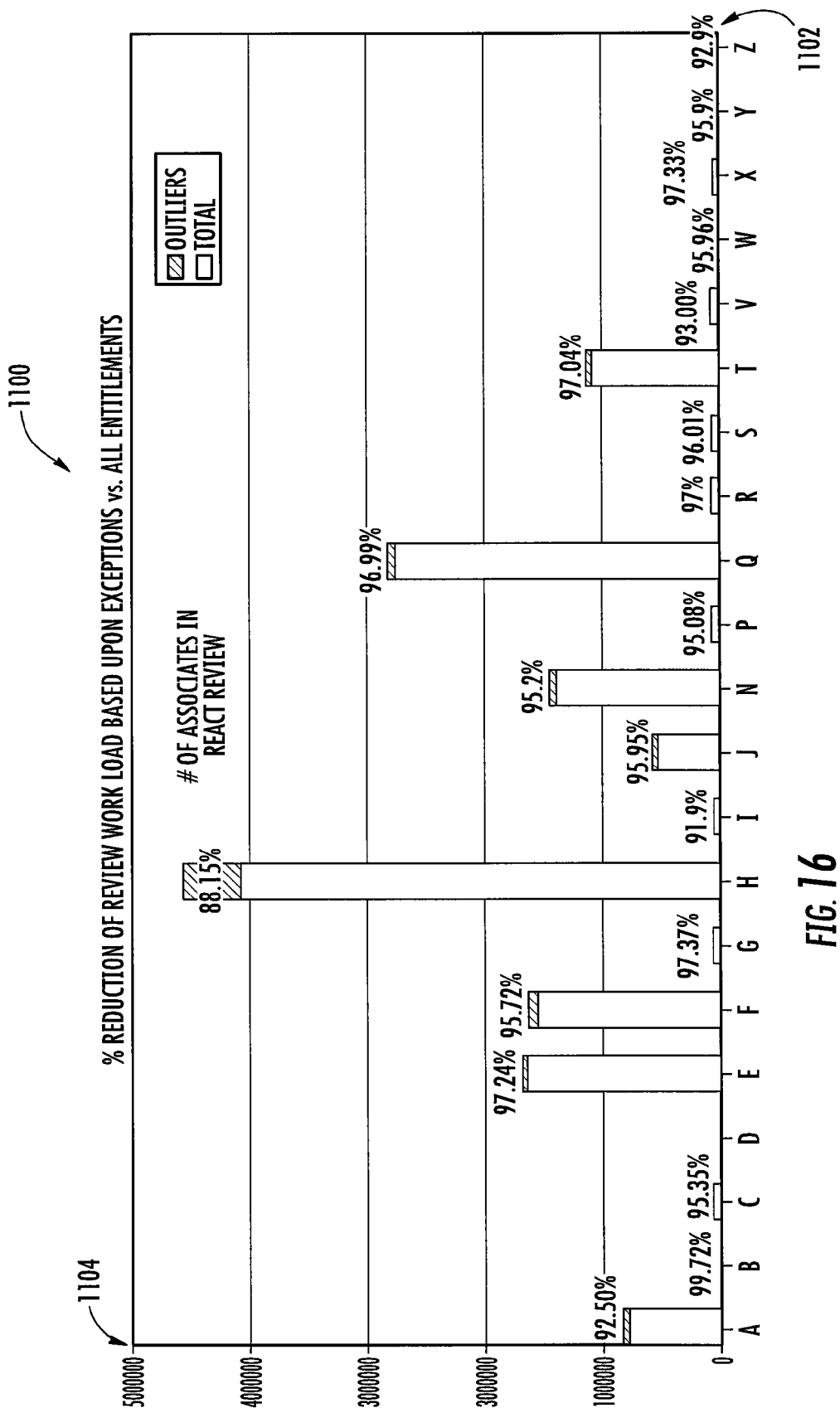
Figure 17:
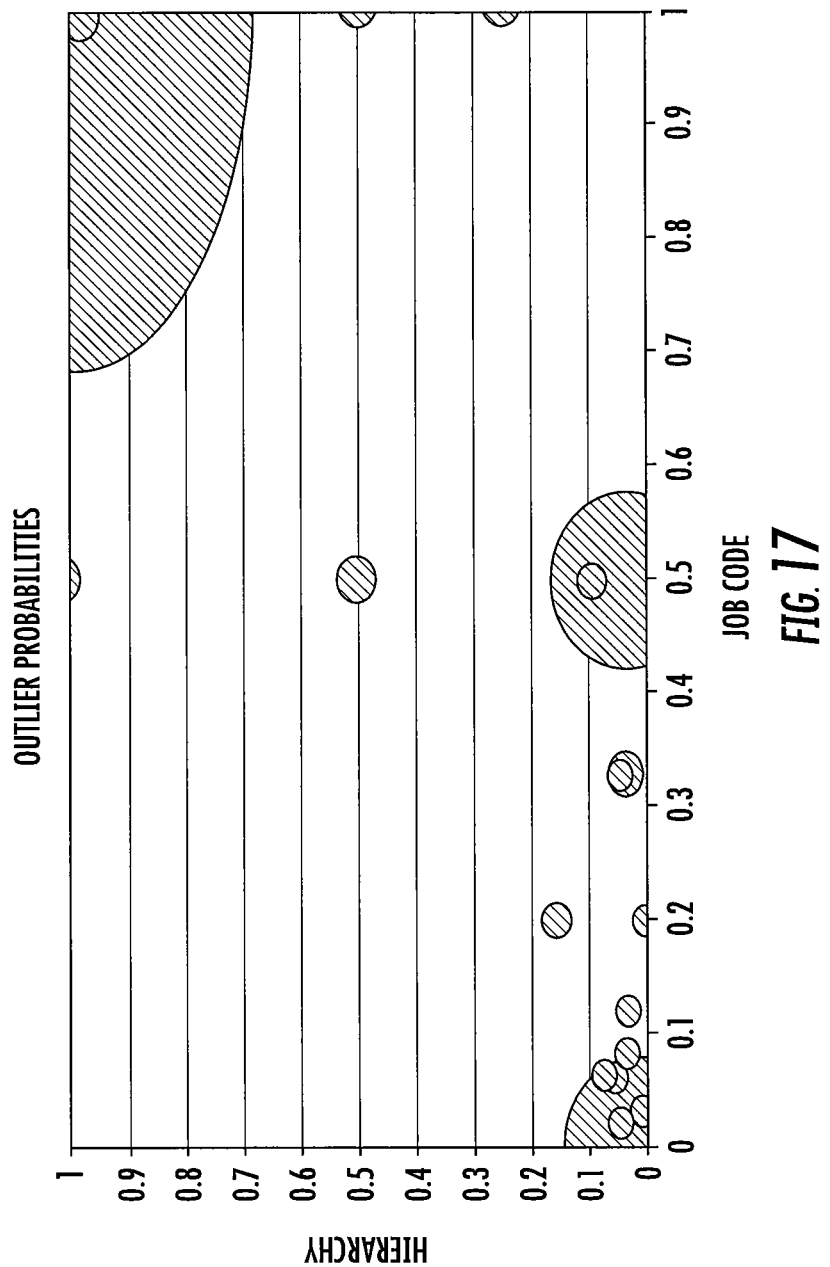

Having thus described embodiments of the invention in general terms, reference may now be made to the accompanying drawings:

FIG. 1 is a is block diagram of a risk outlier module, in accordance with embodiments of the present invention;

FIG. 2 is a block diagram of various risk category score routines, in accordance with embodiments of the present invention;

FIG. 3 is a block diagram of an apparatus including an access entitlement review module, in accordance with embodiments of the present invention;

FIG. 4 is a flow diagram of a method for access entitlement review, in accordance with embodiments of the present invention;

FIG. 5 is a flow diagram of an alternate method for access entitlement review, in accordance with embodiments of the present invention;

FIG. 6 is a flow diagram of a method for determining access review candidates, in accordance with embodiments of the present invention;

FIG. 7 is a flow diagram of a method for performing access entitlement reviews, in accordance with embodiments of the present invention;

FIG. 8 is a user interface display in a system for risk assessment review, in accordance with embodiments of the present invention;

FIG. 9 is another user interface display in a system for risk assessment review, in accordance with embodiments of the present invention;

FIG. 10 is another user interface display in a system for risk assessment review; in accordance with embodiments of the present invention;

FIG. 11 is a user interface display in a system for risk assessment review, highlighting risk score detail; in accordance with embodiments of the present invention;

FIG. 12 is a user interface display in a system for risk assessment review, highlighting risk score detail; in accordance with embodiments of the present invention;

FIG. 13 is another user interface display in a system for risk assessment review, in accordance with embodiments of the present invention;

FIG. 14 is another user interface display in a system for risk assessment review, in accordance with embodiments of the present invention;

FIG. 15 is a bar graph illustrating proof of the effectiveness of inventive concepts; in accordance with embodiments of the present invention;

FIG. 16 is a bar graph illustrating proof of the effectiveness of inventive concepts; in accordance with embodiments of the present invention; and FIG. 17 is a bubble chart illustrating the higher level of confidence of determining risk outliers by utilizing the present invention, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, device, or propagation medium. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 is a block diagram of a risk outlier module 10 that is configured to determine individuals, typically employees, as risk outliers within an entity, such as a business, corporation, enterprise or the like. The risk outlier module 10 includes one or more risk category score routines 20, community average and standard deviation routine 50, risk score normalization routine 60, outlier reinforcement score routine 70 and risk review candidate determining routine 80.

Risk category score routines 20 are configured to determine a raw risk category score 22 for each user/employee 30 within the entity. The entity implementing the risk outlier module 10 can define risk categories and the manner by which scores are determined based on their security requirements, risk tolerances and the like. Therefore, the risk categories selected, the volume of risk categories, and the manner by which risk scores are determined within a category should not be viewed as limiting to the inventive concepts herein disclosed.

In one specific embodiment of the invention, as discussed in more detail in relation to FIG. 2 infra., the risk categories are defined as (1) access, i.e., the entitlements granted to the user/employee; (2) behavior, i.e., the actions taken by the user/employee that could elevate risk; and (3) export, i.e., the user's/employee's ability to move data out of the entity. However, as noted above, other entities may define less or more risk categories and/or different risk categories.

Community average and standard deviation routine 50 is configured to determine community averages 52 and community standard deviations 54 for the plurality of communities 42 within a selected community category 40 based on the raw risk category scores 22 associated with the community 42. Each community category 40 includes multiple communities 42, which are subsets of the overall entity, e.g., the overall employee base. Each user/employee within the entity belongs to each of the community categories 40 and belongs to one, and one only, of the communities 42 within the community category 40. The community average 52 and community standard deviation 54 serve as that community's baseline for that particular risk category. In order to determine a risk outlier (i.e., a user/employee having unusual risk or risk outside of the norm), a user's/employee's normalized risk scores need to be compared to a community baseline.

In accordance with embodiments of the present invention, community categories 40 will vary depending on the entity, such as a company/corporation/enterprise or the like. In one specific embodiment of the invention, two or more community categories 40 within the entity are selected by the entity. Further, the selected community categories 40 should characteristically be reasonable adequate for clustering access entitlement similarities. Moreover, in specific embodiments, in which two community categories 40 are selected, the first community category 40 should be broad in scope and the second community category 40 should be narrow in scope so that statistical extremes are covered for the purpose of determining outliers.

For example, in one specific embodiment of the invention, in which two community categories 40 are selected, referred to herein as a community category pair, the first community category within the pair is job code/job title and the second community category within the pair is organizational hierarchy. In large corporations/enterprises or the like, job code/job title tends to be a broad community category, i.e., one community/job code within the community category may have a large number of users/employees. If a community is large, the likelihood of employees having similar attributes, such as entitlements or the like, is small, as such only those attributes that are common to the community would appear as normal, whereas all other attributes would tend to appear as outliers. Conversely, in large corporations/enterprises or the like, organizational hierarchy tends to be a narrow community category, i.e., one community/hierarchy within the community category may be limited to as few as one user/employee. If a community is small, everything occurring within the community tends to be viewed as "normal". In the instance in which an organizational hierarchy community is defined by a single user/employee, the user's/employee's raw risk category scores are equal to the average, and therefore there is no deviation from the norm.

Risk score normalization routine 60 is configured to determine user/employee normalized risk scores 62 for each risk category 24 and for each community 42. In one specific embodiment of the invention, the normalized risk scores 62 are standard z-scores implemented in conventional statistical analysis. The normalized risk scores 62 indicate how many standard deviations a raw risk score is away from the baseline average it is being compared to. In specific embodiments, the normalized risk score equals the difference between raw risk category score 22 and the community average 52 for the risk category 24 divided by the community standard deviation 54 for the risk category 24. Therefore, in the embodiment in which in which two community categories are selected: (1) job code/title; and (2) organizational hierarchy, and three risk categories are defined (1) access; (2) behavior; and (3) export, six normalized risk scores 62 are determined for each user/employee 30, i.e., (1) access/job code/title normalized risk score; (2) access/organizational hierarchy normalized risk score; (3) behavior /job code/title normalized risk score; (4) behavior/organizational hierarchy normalized risk score; (5) export/job code/title normalized risk score; and (6) export/organization hierarchy normalized risk score.

The outlier reinforcement score routine 70 is configured to determine an outlier reinforcement score 76 for each individual/employee 30. The outlier reinforcement score 76 is the function that combines an individual/employee's normalized risk scores 62 across all risk categories 24 and community categories 40 to increase confidence levels in the determination of outliers. First, an overall community score 72 is determined for each individual/employee 30 by summing all of the positive-valued normalized risk scores 74 for each risk category 24 within the community 42. Only positive-valued scores are implemented in the determination so that a real risk is not hidden when one or more of the score components happen to be sub-normal, i.e., a negative-valued normalized risk score. Once overall community scores 72 have been determined, an outlier reinforcement score 76, is determined by summing all of the overall community scores 72. For example, in those embodiments in which two community categories 40 are implemented (e.g., job code and hierarchy) and three risk categories 24 are implemented (e.g., access, behavior, and export), an overall community score 72 is determined for each of the two community categories by summing the positive-valued normalized risk scores 62 for the three risk categories within the community. Once an overall community score 72 is determined for the job code community category and the hierarchy community category, the two overall community scores 72 are summed to result in the outlier reinforcement score 76.

The risk review candidate determination routine 80 is configured to determine risk review candidates 84, which are the basis for subsequent access entitlement review. Outliers may be determined by comparing the normalized risk scores 62 for each user/employee 30 to corresponding predetermined normalized risk score thresholds 82 and/or comparing the outlier reinforcement score 76 to a predetermined outlier reinforcement threshold 86.

Determining the predetermined normalized risk score thresholds 82 and the outlier reinforcement threshold 86 are imperative to properly identifying risk review candidates. Moreover, the thresholds may be adjusted for specific communities and/or specific access entitlement reviews.

In specific embodiments of the invention, normalized risk scores 62 exceeding a threshold of 1.0 have been used to identify reasonable confidence in outlier/risk review candidate status. Normalized risk scores 62 exceeding a threshold of 3.0 sigma have been used to identify high confidence in outlier/risk review candidate status. However, it should be noted that such threshold values are company/corporation/ enterprise or industry specific and may not apply to all applications of the inventive concepts herein disclosed.

It should be noted that the risk outlier module 10 shown and described in FIG. 1 encompasses some, but not all, embodiments of the present invention. Other outlier modules that determine other attribute outliers besides risk outliers are also contemplated and within the inventive concepts herein disclosed. In such embodiments, attribute raw score are determined across one or more attribute categories; community averages and community standard deviations are determined across the attribute categories for two or more community categories; normalized attribute scores are determined based on the raw attribute scores, community averages and community standard deviations; outlier reinforcement scores are determined for various community categories and attribute outliers are determined based on comparison of the normalized attribute scores to predetermined thresholds and comparison of the outlier reinforcement scores to predetermined thresholds.

FIG. 2 provides a block diagram of various exemplary risk category score routines 20; in accordance with further embodiments of the invention. As previous noted. The type of risk categories, the volume of risk categories and/or the manner in which a risk category is scored will depend upon the risk requirements of the entity implementing the risk outlier determination mechanism of the present invention.

The risk categories included in FIG. 2 are based on the assumption that risk can be conceptually defined as :

$$R_{(user)} = [\Sigma(e \cdot W_e)] \cdot UA \cdot [1/C]$$

where, $R_{(user)}$=the total risk for an user/employee;
e=entitlement to a single resource;
$W_e$=an adjusted weighted risk for the entitlement based on exposure;
UA=the user's/employee's probability of committing future negative impact based on past actions;
C=complexity required to expose information once obtained.

Based on the risk formula, the three risk categories include (1) access, i.e., entitlements granted to an individual employee); (2) behavior, i.e., actions of the user/employee that could elevate risk, and (3) export, i.e., the ability of the user/employee to move physical and/or non-physical assets (e.g., information, data or the like) out of the company, enterprise, entity or the like. Within the risk score module 20 each of the risk categories 24 are scored independently according to their specific context.

Access risk score routine 100 is configured to determine an access risk score 102 for each entitlement 104 granted to a user/employee 30 within the entity. Each access risk score 102 is based on a platform class of the entitlement and an application risk score for the application/document associated with entitlement and the user/employee. An overall raw access risk score 106 may be determined by summing each of the access risk scores 102.

Behavior risk score routine 110 is configured to determine a single raw behavior risk score 112 for the user/employee 30 at a specific point in time. Behavior risk scores 112 are based on various employee activities, such as, but not limited to, web access/traffic to malicious/data manipulation websites, data movement to removable media, electronic mail (email) sent or blocked that include non-public information, non-public information stored locally on employee's computing device, mainframe activity and the like. Additionally, behavior risk scores 112 are based on employee trends, such as, but not limited to, spikes in typical activity, average activity being higher than the entities average, off-hours activity and the like. In addition, the behavior risk scores 112 are based on employee classifications, including, but not limited to, whether the user/employee is a contractor or a regulated user/employee.

Behavior risk scores 112 are determined using activity from a predetermined prior period, for example, the last thirty days or the like. Additionally, behavior risk scores 42 may be determined on a regularly scheduled basis, such as daily or the like. In specific embodiments, the employee activities, trends and classifications are weighted based on how suspicious or potentially harmful the activity, trend or classification may be.

Export risk score routine 120 is configured to determine a raw export risk score 122 for the user/employee 30 at a specific point in time. The export capabilities, which are the basis for the export risk score 122, are determined by user/employee exceptions to bypass blocking controls. The export exceptions may include exceptions related to physical and/or non-physical assets. For example, the export exceptions may include, but are not limited to, access to write to removable media/storage, access to web-based email accounts, unfiltered access to the Internet, access to certain hardware, such as laptop computers, and the like.

Referring to FIG. 3 a block diagram is shown of an apparatus 130 that includes an access entitlement review module 140 configured to manage the entitlement review process, in accordance with embodiments of the present invention. The apparatus 130 includes a computing platform 132 having a memory 134 and a processor 136 that is in operable communication with the memory 134. The memory 134 stores risk outlier module 10 shown and described in FIG. 1. Risk outlier module 10 is configured to determine one or more, and typically a plurality of entitlement review candidates 84 based on one or more outlier entitlements being associated with the entitlement review candidate 84. It should be noted that the risk outlier module 10 shown and described in FIG. 1 is an exemplary module for determining entitlement review candidates 10 used in one or more, but not all, embodiments of the invention. As such, any module, application, routine or manual procedure for determining access review candidates may be used in conjunction with the access entitlement review process without departing from the inventive concepts herein described and claimed.

The memory 134 of apparatus 130 additionally stores access entitlement review module 140 that is configured to provide for management of access entitlement reviews. The access entitlement review module includes access entitlement review application 142 that is configured to provide access entitlement reviewers, such as entitlement review candidates, associated managers and/or access review managers, access to an entitlement listing 144 of one or more access entitlements 146 (e.g., risk outliers) associated with each of the one or more entitlement review candidates 84. FIGS. 8-14 provide exemplary user interfaces provided by the access entitlement review application 142 that provide users (i.e., access entitlement reviewers) access to the entitlement lists 144 of one or more access entitlements 146 associated with each of the one or more entitlement review candidates 84. In one embodiment of the invention, the access entitlement review application is configured to communicate notifications 151, such as email notifications or the like, to the access reviewer that serve to notify the access reviewer of the requirement to perform an access review and the time period for completing the review.

The access entitlement review module is further configured to receive one of a justification input 148 or a revocation input 150 from the access entitlement reviewer. In one embodiment in which the access entitlement reviews are conducted preliminarily by the access review candidates (i.e., self-reviews) and subsequently by a manager of the access review candidate, preliminary justification inputs 148 and revocation inputs 150 are received by the access review candidates and the manager may subsequently confirm the access review candidate's justification inputs 148 and/or revocation inputs 150 or override the access review candidate's inputs. In other embodiment of the invention in which the access entitlement reviews are conducted by an access review facilitator (i.e., an individual other that the access review candidate or manager assigned by the entity to perform such access entitlement reviews), the justification inputs 148 and revocation inputs 150.

The access entitlement review module 140 additionally includes access entitlement review results queue 152 which is configured to store the access entitlement review results. Specifically, the results queue 152 stores a justification input 148 or revocation input 150 for each access entitlement in an entitlement list 144 associated with each identified entitlement review candidate 84. A revocation input 150 subsequently prompts revocation of the entitlement. In specific, the revocation may be configured to occur automatically, while in other embodiments revocation may be a manual process conducted by revocation facilitators or the like. In the event that the revocation is a manual process, the access entitlement review application 142 may be configured to communicate revocation notifications 154 to applicable revocation facilitators or the like assigned to conduct the revocation. Additionally, in those embodiments in which the revocation is conducted manually, the access entitlement review module may include a revocation tracking application 156 configured to track the progress of revocations and notify specified individuals or entities of the progress of revocations and/or the delinquent revocations.

FIG. 4 is a flow diagram of a method 160 for performing access entitlement reviews, in accordance with embodiments of the present invention. At Event 162, one or more entitlement review candidates are determined from amongst a plurality of associated (e.g., employees) associated with an entity (e.g., corporation, enterprise or the like). As previously noted, the entitlement review candidates may be determined or identified using any feasible means. Thus, the entitlement review candidate determination process may be an automated procedure or may be a manual procedure.

In one specific embodiments, as discussed in relation to FIG. 1, the entitlement review candidates (i.e., risk outliers) may be automatically determined by identifying two community categories (e.g., job code and hierarchy), such that each associate/employee belongs to one, and one only, community within a community category. In such embodiments, entitlement review candidates may be determined by determining one or more normalized risk scores for the plurality of associates, the risk scores are associated with risk categories, such as, but not limited to, access, behavior, export and the like. In specific embodiments normalized risk scores are determined by determining community averages and community standard deviations for each community within the community categories based on the raw risk scores for the community. The normalized risk scores are subsequently determined based on the raw risk scores, the community averages and the community standard deviation. The risk review candidates are determined by comparing the normalized risk scores to predetermined risk score thresholds. In additional embodiments, risk review candidates may be determined by determining one or more outlier reinforcement scores by summing positive-valued normalized risk scores within a community and summing the overall community scores from two or more community categories. The outlier reinforcement scores are subsequently compared to predetermined outlier reinforcement score thresholds to determine risk review candidates (i.e., risk outliers).

At Event 164, a listing of one or more access entitlements associated with each of the one or more entitlement review candidates is provided. The access entitlements may be all the entitlements associated with the associate or the access entitlements may be limited to only those entitlements determined to be risk outliers (i.e., those entitlements that led to the determination of the associate being a risk review candidate). In specific embodiments, the listing of entitlements is provided by a network-accessible display, such as websites provided via the Internet or an intranet. Examples of user interfaces for providing the listing of entitlements via network-accessible display are shown and described in relation to FIGS. 8-14, infra.

In specific embodiments, the listing of entitlements is provided to the associated risk review candidate for self-review. In such embodiments, the listing is also provided to the risk review candidate's manager (or someone having authority over the risk review candidate). The manager is tasked with confirming and/or overriding entitlement justification and/or revocation as provided by the risk review candidate's self review. In other embodiments of the invention, the listing of entitlements is provided to a third party individual, such as a risk review facilitator, who may conduct the review of the entitlements absent a self-review by the risk review candidate.

At Event 166, a justification input or revocation input is received for each of the one or more access entitlements. In one embodiment of the invention, the justification input or revocation input are received from the manager (or someone superior in the hierarchical chain) of the access review candidate. In specific embodiments of the invention, the justification inputs and/or revocation inputs from the manager are based at least partially on access entitlement review responses from the access review candidate (i.e., self-reviews). In such embodiments, the access review candidate provides initial self-review of their access entitlements, followed by confirmation or override of the self-review by the manager. As such, the manager is ultimately responsible for providing the justification or revocation inputs for the access review candidate's entitlements. In another embodiment of the invention, the justification input or revocation input are received from a third party reviewers, such as an access entitlement facilitator or the like. The third party reviewer may be necessarily in the event a manager is unavailable or the job class of the access review candidate dictates access entitlement review by a third party as opposed to a manager. In such embodiments the third party facilitator may provide the justification and/or revocation inputs based on their own analysis of the entitlements or, in other embodiments, the third party facilitator may base their inputs at least partially on access entitlement review responses from the access review candidate (i.e., self-reviews).

At Event 168, revocation of one or more of the access entitlement reviews are provided for based on the revocation input. In certain embodiments of the invention, the revocations may occur automatically based on the received revocation inputs, while in other embodiments, a revocation facilitator may be necessary to manually provide for the revocation of the access entitlements. In such embodiments in which the revocation is provided by a revocation facilitator, a revocation notification may be automatically sent to the revocation facilitator which lists the access entitlements requiring revocation. Additionally, in those embodiments in which the revocation facilitator is responsible for revoking entitlements, the method may include tracking the revocations to insure that revocation occurs within a specified time period.

Turning the reader's attention to FIG. 5, a flow diagram is presented of an alternate method 170 for performing access entitlement reviews, in accordance with embodiments of the present invention. At Event 172, a self-entitlement review notification is electronically communicated to an associate/employee requiring access entitlement review. The notification serves to notify the associate/employee that a self-assessment of access entitlements is required of the associate/employee. The self-assessment may be for all of access entitlements that the associate/employee currently holds or the self-assessment may be limited to those access entitlements determined to be risk outliers. In specific embodiments, the access review candidates and/or the risk outlier entitlements associated with access review candidate may be determined by the process described in relation to FIG. 1, while in other embodiments other means may be implemented to determine the access review candidates and/or associated access entitlements. In addition, the self-entitlement review notification may provide the access review candidate with instructions for accessing a network-based access review system. One example, of such a system is shown and described in FIGS. 8-14, infra. In specific embodiments the self-entitlement review notification will prescribe a time period for the access review candidate to complete the review, for example within five business days or the like. Additionally, the self-entitlement review notification may mandate that the associate/employee provide a specific justification input for access entitlements deemed by the associate/employee to be needed/required for their job responsibilities. In such event, the notification may inform the associate/employee that absent a justification input, the access entitlement will be revoked.

At Event 174, an access entitlement review notification is electronically communicated to manager or some other higher level associate/employee of the access review candidate. The notification serves to inform the manager that an access entitlement review is required for the one or more associates/employees stated on the notification. The access entitlement review may be for all of access entitlements that the associate(s)/employee(s) currently hold or the self-assessment may be limited to those access entitlements determined to be risk outliers. In addition, the access entitlement review notification may provide the manager with instructions for accessing a network-based access review system. One example, of such a system is shown and described in FIGS. 8-14, infra. In specific embodiments the access entitlement review notification will prescribe a time period for the access review candidate to complete the review, for example within five business days or the like.

At Event 176, the manager is provided with access to self-entitlement review responses inputted by the associate/employee. In specific embodiments, access may be provided by communicating a notification to the manger that either provides the self-entitlement review responses to the manager or informs the manager that the access review candidate has completed their self-review. In those embodiments of the invention in which the notification informs the manager of the candidate's completion of the self-review, the manager may access a network-based access entitlement review system, for example, the system shown and described in relation to the user interfaces shown in FIGS. 8-14, infra., to view the candidate's self-entitlement review responses.

At Event 178, entitlement review responses are received from the manager, which are based at least in part on the self-entitlement review responses. The manager provided entitlement review responses are deemed the definitive responses that result in confirming an access entitlement or mandating that an access entitlement be revoked. The self-entitlement review responses provide the manager with a baseline for performing their access entitlement review. For example, if an access review candidate has recommended revocation of an access entitlement, the manager will, in most occurrences, concur with the candidate's revocation response without the need to perform extensive analysis on the revocation recommendation. Similarly, if the access review candidate has provided sound rationale as justification for maintaining the access entitlement, the manager will, in most instances, concur with the candidate's assessment that the access entitlement be maintained.

At Event 180, the entitlement review responses received from the manager are stored in an entitlement review queue. In specific embodiment of the invention, the entitlement revocations included in the entitlement review responses prompt automated or non-automated revocation. Non-automated revocation provides for forwarding the revocations to a revocation facilitator who performs or insures manual revocation of the access entitlements. Additionally, manual revocation may provide for the method to optionally including tracking of the revocations to insure that the revocation occurs and that the revocation occur in a timely fashion (i.e., within a predetermined time period).

In alternate embodiments of the method 17-, shown and described in FIG. 5, an entitlement review notification may be communicated to an entitlement review facilitator in lieu of communicating the entitlement review notification to the manager and, in most embodiments, the self-review notification to the associate/employee. In such embodiments, the access entitlement review is performed by the access entitlement facilitator as opposed to the manager, and in most embodiments, as opposed to the manager and the associate requiring entitlement review.

FIG. 6 provides for a flow diagram of a method 200 for outlier determination and, more specifically risk scoring and risk candidate review selection; in accordance with embodiments of the present invention. FIG. 6 illustrates the flow chart in terms of horizontal "swim lanes" associated with various phases of the method 200 and the data sources implemented in the method 200. Thus, data source "swim lane" 202 depicts the various data sources implemented in the method 200. Outlier detection "swim lane" 204 depicts the events in the outlier detection phase of the method 200, risk score "swim lane" 206 depicts the events in the risk score phase of the method 200 and candidate selection "swim lane" 208 depicts the events in the candidate selection phase of the method 200.

Beginning at Event 210, within the outlier detection "swim lane" 204, listings of previous approved outliers and pending revocations are received from the approval queue and revocation queue 212 and are subsequently filtered out from the overall listings of entitlements and users/employees, received from the entitlement/access control data source 214 and the user/employee data source 216. The approval queue and revocation queue represent data from previous outlier detection, risk scoring and candidate selection processing. Specifically, the approval queue represents previously detected outliers that were approved during later assessments and the revocation queue represents previously identified entitlement revocations that are currently pending. The approved outliers and pending revocations are filtered out from the overall lists of entitlements and users/employees, prior to conducting the outlier detection, to eliminate redundancy in reviewing approved outliers and revoking previously revoked entitlements.

At Event 218, high-level outlier detection occurs based on a predetermined threshold percentage of likelihood that an entitlement is an outlier. The outlier detection serves to filter the overall entitlement database prior to determining risk scores. In one specific embodiment of the invention, the predetermined threshold percentage is defined as sixty-eight percent (68%), such that, entitlements having a 68% or greater likelihood of being an outlier are subjected to subsequent risk scoring and risk outlier determination. Conventional statistics have shown that entitlements having an outlier likelihood of 68% or greater are at least one standard deviation away from the mean of the population. The result of the high-level outlier detection is the outlier queue 220, which is subjected to subsequent risk scoring and lower-level outlier detection.

At Event 222, within the risk score "swim lane" 206, risk scores are calculated for the outliers in the high-level outlier queue 220. The risk scores are determined based on risk data determined from multiple risk data sources 224-1, 224-2, 224-3 and 224-nth within the entity. As previously discussed risk scores may be calculated for one or more risk categories. Risk categories and the related risk score determination may be specific to the entity determining risk outliers, as such the quantity and type of risk categories and the method by which risk is scored for any one risk category are not germane to the inventive concepts herein disclosed and, thus may vary accordingly. In one specific embodiment of the invention, the risk categories may include behavior, access and export.

At Event 226, the risk scores are standardized, otherwise referred to as normalized, by determining risk category community averages and risk category community standard deviations for each community within a predetermined community category. As previously noted, the community average and standard deviation serve as that community's baseline for a particular risk category. In order to determine a risk outlier (i.e., a user/employee having unusual risk or risk outside of the norm), a user's/employee's normalized risk scores needs to be compared to a community baseline. Corresponding normalized risk scores are subsequently determined based on the risk scores determined at Event 222 and the associated corresponding risk category and a corresponding community. As previously noted, in one specific embodiment of the invention, the normalized risk scores are standard z-scores implemented in conventional statistical analysis. The normalized risk scores provide an indication of how many standard deviations a raw risk score is away from the baseline average it is being compared to. In specific embodiments, the normalized risk score equals the difference between the risk score for a risk category and the community average for the risk category divided by the community standard deviation for the risk category. In addition, outlier reinforcement scores are determined for a user/employee by summing all of the positive-valued normalized risk scores for each risk category within a community to result in an overall community score and summing all of the overall community scores to result in the outlier reinforcement score.

The risk scoring, risk score normalization and outlier reinforcement scoring, results in a risk summary queue 228. In one specific embodiments of the invention, the risk summary is user/employee-based and includes normalized risk scores for each risk category and the community within each community category that the user/employee is associated with, as well as, the user's/employee's outlier reinforcement score.

At Event 230, within the candidate selection "swim lane" 208, predetermined hierarchies may be excluded from the risk candidate review process. Predetermined hierarchies, for example, predetermined groups or segments of an organization may be excluded for the purpose of limiting the scope of the risk review process. In other embodiments, in which the entire organization, enterprise, entity or the like is subject to the risk review process, the need to exclude predetermined hierarchies may not be required.

At Event 232, predetermined thresholds, such as sigma thresholds may be applied to the normalized risk scores and the outlier reinforcement scores to determine risk review candidates. In specific embodiments of the invention, four-sigma, five-sigma or the like may be selected as the predetermined threshold for normalized risk scores and/or outlier reinforcement scores, such that scores meeting or exceeding the four-sigma, five sigma or the like threshold will provide for risk review candidate selection. At Event 234, based on normalized risk scores, the outlier reinforcement scores and the corresponding applied thresholds, automated candidate selection provides for selecting candidates for risk review and placing the candidates into the risk review queue 236 for subsequent risk review processing, as detailed in FIG. 8.

At Event 238, manual additions and/or deletion can be made to the candidate risk review list. As shown, the manual addition and/or deletion of risk review candidates may occur after completion of risk scoring (Queue 228) but prior to application of score thresholds (Event 232). In other instances, manual addition and/or deletion of risk review candidates after the application of the thresholds (Event 232) and automated risk review candidate selection (Event 234). In still further instances, manual addition and/or deletion of risk review candidates may occur after the risk review candidates have been placed in the risk review candidate queue 236.

FIG. 7 provides for a flow diagram of a method 250 for risk/entitlement review assessment, in accordance with embodiments of the present invention. FIG. 7 illustrates the flow chart in terms of horizontal "swim lanes" associated with various phases of the method 250 and the corresponding entity tasked with implementing the events/processes of the method 250. Thus, associate "swim lane" 252 depicts events conducted by or associated with the associate/employee who is undergoing risk/entitlement review. Manager "swim lane" 254 depicts the events conducted by or associated with the manager of the associate who is undergoing risk/entitlement review. Review facilitator "swim lane" 256 depicts the events conducted by or associated with a review facilitator. Automated risk review "swim lane" 258 depicts the events conducted by or associated with the automated risk/entitlement review portion of the method 250. Revocation facilitator "swim lane" 260 depicts the events conducted by or associated with an entitlement revocation facilitator.

At Decision 262, a workflow decision is made within the automated risk review process. If the workflow is the initial associate/manager workflow, at Event 264, a notification requiring action is sent to the associate undergoing risk/entitlement review and, concurrent with Event 264, at Event 266 a courtesy (i.e., non-action) notification is sent to the associate's manager notifying the manager that a risk/entitlement review has been initiated for the specified associate. At Event 268, once the associate has received the notification, the associate is tasked with conducting a self-review of their entitlements, in which the associate verifies the need to continue possessing entitlement(s) and/or request revocation of entitlement(s) no longer deemed necessary. If the associate deems entitlements necessary, the associate may also be required to provide one or more reasons for requiring the entitlement. Associate self-reviews are instrumental in providing the manager with insight as to the need for the associate to maintain or revoke an entitlement. In this regard, the legwork provided by the associates during self-reviews result in time savings at the managerial end. In certain embodiments of the invention, the associate is allotted a predetermined period of time to conduct the self-review, for example within five days or the like. Once the associate has completed the self-review, the associate communicates, via the system, the self-review responses to the manager.

At Event 270, a notification requiring action is sent to the manager that informs the manager of the need to perform a manager level risk/entitlement review of the associate. The notification requiring action is sent proximate in time to the completion by the associate of their self-review and/or proximate in time to the completion of the allotted predetermined period of time for the associate to conduct the self-review. Once the manager has received the self-review from the associate via the system, at Event 272, the manager is tasked with conducting a review of the associate's entitlements, in which the manager makes a definitive decision on the associate's need to continue possessing entitlement(s) and/or a decision to revoke entitlement(s). In certain embodiments of the invention, the manager is allotted a predetermined period of time to conduct the manager-level review, for example within five days or the like. Once the manger has completed the entitlement review, the risk/entitlement responses are communicated to the review queue 274, which stores review results.

If, at Decision 262 a determination is made that the workflow is the centralized facilitator workflow, at Event 276, a notification requiring action is sent to the review facilitator requiring the review facilitator to conduct a risk/entitlement review for a specified associate. In addition to the notification requiring action, at Event 278, a courtesy notification may be sent to a supporting/managerial facilitator and/or the associate's manager notifying the same that a risk/entitlement review is being initiated. The centralized facilitator workflow is undertaken in the event the associate and/or manager workflow is not appropriate or can not be conducted. In certain instances it may not be appropriate or feasible to contact the associate and/or the associate's manager to conduct a risk/entitlement review. In such instances, the review facilitator, otherwise referred to as a review proxy, is contacted to conduct the risk/entitlement review. It should be noted that while the illustrated embodiment of the centralized facilitator workflow does not require an associate review, in other embodiments and associate review may be conducted and used in conjunction with the facilitator review.

At Event 280, the review facilitator conducts the risk/entitlement review for the specified associate. In certain embodiments of the invention, the review facilitator is allotted a predetermined period of time to conduct the risk/entitlement review, for example within ten days or the like. In specific embodiments of the invention the time allotted to the review facilitator is equal to the cumulative time allotted to the associate and manager to conduct both the associate self-review and the manager review. By allotting equal time to the review facilitator and the associate/manager, the facilitator reviews and associate/manager reviews can occur in parallel with equivalent schedules.

The risk/entitlement review queue 274 receives review responses from both the managers and the facilitators based on the workflow assigned to the risk/entitlement review. The risk entitlement review queue 272 stores risk/entitlement review results, including entitlements that are to remain active and entitlements that are marked for revocation, as well as a time stamp reflecting the date/time of the risk/entitlement review.

At Event 276, a notification requiring action is sent to a revocation facilitator (i.e., a de-provisioner), who is responsible for performing the necessary actions to revoke, or otherwise referred to as de-provision, entitlements. At Event 278, the revocation of entitlements requiring revocation occurs. It should be noted that in certain embodiments the revocation facilitator is required to communicate with system managers who are ultimately responsible for revoking the entitlements. Thus, in specific embodiments of the invention, the automated review process may further include monitoring of the revocation requests for the purpose of tracking when revocations occur and when the entitlement actually is removed.

Referring to FIG. 8, shown is a graphical user interface display 300 in a system for risk assessment review, in accordance with an embodiment of the present invention. Specifically, FIG. 8 demonstrates how organization risk can be mapped to identify where the most risk resides in the entity, such as a corporation, enterprise or the like. Further, the graphical user interface display depicts how rules can be written to select candidates based on thresholds. In the illustrated example, organizational hierarchy has been selected as a community category. The furthest left column 302 under the hierarchy heading 304 represents the highest level in the organization hierarchy, i.e., the entity, corporation, enterprise or the like. The second furthest left column 306 under the hierarchy heading 304 represents the next highest level in the organization hierarchy and so forth proceeding left to right. A user may mouse hover over a community hierarchy to reveal risk related statistics 308, such as the population in the community, the community average and the community standard deviation. In addition, each community/level listed in a hierarchy provides a link to a high risk user list for that particular community/level.

The deviation percentage heading 310 provides for average deviation percentage 312 and standard deviation percentage 314. The average deviation percentage is defined as: current-baseline average divided by baseline average of the community being compared to, with the quotient being multiplied by one-hundred to provide for a percentage. The standard deviation percentage is defined as: current-baseline standard deviation divided by baseline standard deviation of the community being compared to, with the quotient being multiplied by one-hundred to provide for a percentage. The graphical user interface display 300 includes a comparison selector 316 in the upper left-hand corner that provides for the user to select the level of hierarchy for comparison, i.e., the ability to make comparisons to different community baselines. In the illustrated example, "One Up Hierarchy" has been selected from the drop-down menu 318 and, as such, each level in the organizational hierarchy is being compared to the level immediately above it on a percentage basis.

Thus, based on the selected "One Up Hierarchy," the "GBM" community average 320 is shown to be eleven percent lower than the parent hierarchy, "entity" average. Further, the "J" community average 322 is shown to be seventeen percent higher than the parent hierarchy, "GBM" average. Moreover, the "JDE" community average 324 is shown to be twenty-eight percent higher than the parent hierarchy, "JD" average, and so on.

In the illustrated example of FIG. 8, thresholds have been set at five percent, such that average deviation percentage 312 and standard deviation percentage 314 entries greater than five percent above average are indicated by a cross-hatching pattern, average deviation percentage 312 and standard deviation percentage 314 entries greater than five percent below average are indicated by a dot pattern and all other average deviation percentage 312 and standard deviation percentage 314 entries are indicated by no pattern. A rule for automated selection would operate in a similar manner, selecting the entries represented the cross-hatching pattern as risk review candidates.

Referring to FIG. 9 shown is another graphical user interface (GUI) display 400 in a system for risk assessment review, in accordance with an embodiment of the present invention. Specifically, FIG. 9 depicts a report of "high risk users" used to identify risk review candidates, the list shown in FIG. 9 may be accessed by clicking-on or otherwise activating the link associated with the level/community displayed in the hierarchy columns of FIG. 8. Further, the GUI display 400 depicts how rules can be written to select candidates based upon thresholds.

The top portion 402 of the GUI display 400 allows for the user to filter the high risk user list further based on various parameters. The columns in the high risk user list 404 represent user/employee name 406, job code 408, job title 410, hierarchy 412, line of business 414 and the like. The normalized risk score columns 416 provide for risk category normalized scores, such as access normalized score 418, behavior normalized score 420 and export normalized score 422 and an overall outlier reinforcement score. i.e., the overall score 422. The normalized risk score columns 416 are sortable to provide for listing, in descending or ascending order the risk within a specified risk category or overall risk. In addition, the users/employees 406 displayed in the high risk user list 404 provides for links to a risk scorecard detail for that particular use/employee.

In the illustrated example of FIG. 9, thresholds have been set to indicate different levels of scores. For example, scores equal to or less than zero are indicated with no pattern, scores between zero and three are indicated by a dot pattern and scores greater than three are indicated by a cross-hatching pattern. A rule for automated selection operates in a similar manner, selecting scores greater than zero (including scores greater than three) as risk review candidates. Thus, those entries indicated by the dot pattern (i.e., between zero and three) and the cross-hatching pattern (i.e., greater than three) would be risk review candidates Turning the reader's attention to FIG. 10, shown is a graphical user interface display 500 in a system for risk assessment review in accordance with embodiments of the present invention. Specifically, FIG. 10 depicts a user/employee risk scorecard for a specific user/employee within the entity, "Name", employee number "12345678". The user/employee risk scorecard may be accessed by clicking-on or otherwise activating the link associated with the user/employee name in the "high risk user" list shown in FIG. 9.

The top portion 502 of the graphical user interface of FIG. 10 provides for user/employee identifying information such as employee number 504, name 506, employee job title 508, employee job status 510, employee line of business 512, employee job code 514, manager name 516, manager identification 518, manager title 520, manager job status 522, manager line of business 524, manager job code 526 and the like. The display also provides for a link 528 to submit the user/employee for a risk review, which adds the user/employee to the risk review queue. In the instances that automated rules are employed to make selections for risk review based on predetermined thresholds, the rule decisions may require verification, at least at the onset of the automated selection process, to ensure the correct decisions for review are being made.

The risk summary portion 530 of the user/employee risk scorecard provides columns for community category, i.e., aggregator type 532; community, i.e., aggregator 534; and the population within the community 536. In addition the risk summary portion includes raw risk scores 544 for each risk score category, i.e., access 538, behavior 540 and export 542. For each risk category, the community (i.e., aggregator) average 546, the community standard deviation 548, the community sigma score 550 (i.e., the number of standard deviations away from average) and the community category/aggregator type sigma score 552 (i.e., the summed total of all positive valued sigma scores for the individual communities within the community category) are depicted in the rows. In addition, a column for overall 554 provides for overall community sigma score (i.e., the sum of the individual risk category sigma scores) and overall community type sigma score (i.e., the sum of the community sigma scores).

In addition, a link 556 is provided in the display 500 of FIG. 10 that is operable to return to the "high risk user" list, shown in FIG. 9.

Referring to FIGS. 11 and 12 depicted are further graphical user interface displays 600 and 700 in a system for risk assessment review, in accordance with a further embodiment of the invention. Specifically, FIGS. 11 and 12 show risk score details associated with a specified user/employee, " Name". The displays 600 and 700 of FIGS.11 and 12 can be accessed by clicking-on or activating an appropriate link in the display shown in FIG. 10. The risk score details includes columns for the risk category (i.e., classification) 602/702, the raw risk category score 604/704, the details of the risk activity associated with the category 606/706 and the actions taken by the manager in light of the risk detail/activity 608/708. The risk detail 606/706 and manager action fields 608/708 are collapsible fields accessible by clicking-on the plus sign 610/710 located next to the risk category name. In the display shown in FIG. 11 behavior 612, classification 614 and export 616 risk categories have been activated to display the risk details 606 and manager actions 608 associated with these categories. The access 618 risk category has not been activated and, thus, risk details 606 and manager actions 608 are not displayed for this risk category. In the display shown in FIG. 12, the access 718 risk category has been activated to display the eleven access-related details/activities 706 and the associated manager actions 708. Once an analyst has reviewed the risk score details for a specified user/employee, the analyst can choose to submit the user/employee for risk review. In addition, the displays shown in FIGS. 11 and 12 can be used to verify the appropriateness of selections made by a set of automated rules.

Referring to FIGS. 13 and 14 depicted are further graphical user interface displays 800 and 900 in a system for risk assessment review, in accordance with a further embodiment of the invention. Specifically, FIG. 13 shows a user/employee review display, in which the user's/employee's entitlements are displayed and the user/employee is tasked with provided justifications for their respective entitlements. FIG. 13 displays the platforms 802, i.e., the applications, servers, domains and the like, which the user/employee has been granted entitlement to use. If the user/employee deems a platform as not appropriate or necessary for job duties, the user/employee may revoke access to the platform in total by checking the box in the "revoke all access" column 804. Each platform displayed may be expanded by clicking-on or otherwise activating the plus key 806 displayed to the left of the platform. The expanded view provides for a listing of the individual unusual entitlements (i.e., outliers) associated with the platform and a field for user/employee justification inputs. The user/associate is tasked with providing justification for all entitlements or requesting that the entitlement be revoked. In certain embodiments of the invention, in the event no justification is provided by the user/associate, the unusual entitlement/outlier may be revoked. Such automatic revocation in the absence of justification is typically a policy decision of the risk-managing entity, enterprise, company or the like.

In the illustrated example of FIG. 13, the application entitled "Derivation Bo Infrastructure" has been expanded to provide the listing of individual outliers 808. The user/associate provides justification inputs into the entry fields 810 associated with the displayed outliers, i.e., "accounting and "creatboportfolio" or checks the box 812 under the revoke column 814 to request revocation of the entitlement.

It certain embodiments of the invention, if the user/employee fails to complete the review or fails to complete the review within a predefined time period, all of the unusual entitlements/outliers will be revoked. Such automatic revocation of all the unusual entitlements/outliers in the event that the user/employee fails to complete the review is typically a policy decision of the risk-managing entity, enterprise, company or the like. Once the user/employee has completed reviewing and provided justifications of their entitlements, the manager reviews the user's/employee's responses and has the authority to change the entitlements as need requires.

FIG. 14 shows the manager review display 900, in which the manager or facilitator is presented with the outlier entitlements associated with a user/employee and is tasked with review of the associate's responses. The manager will either confirm or deny the justifications; denial of a justification is in the form of revocation of the entitlement. FIG. 14 displays the platforms 902, i.e., the applications, servers, domains and the like, which the user/employee has been granted entitlement to use. If the manager deems a platform as not appropriate or necessary for job duties of the use/employee, the manager may revoke access to the platform in total by checking the box in the revoke all access column 904. In the illustrated example of FIG. 14, the manager/facilitator has accepted the user/employees request to revoke the entitlement associated with Application "SAM Application AIT # 2836" as evident by the box in the revoke all access column remaining as checked. Each platform/application displayed may be expanded by clicking-on or otherwise activating the plus key 906 displayed to the left of the platform. The expanded view provides for a listing of the individual unusual entitlements/outliers associated with the platform and displays the user/employee justification inputs.

In the illustrated example of FIG. 14, the application entitled "Derivation Bo Infrastructure" has been expanded to provide the listing of individual outliers 908. The manager/facilitator has overridden the user/employee responses shown in FIG. 13. Specifically, the manager/facilitator has checked the box 912 under the revoke column 914 to request revocation of the "accounting" entitlement and has provided a revocation justification input into the corresponding entry field 910. In addition, the manager/facilitator has un-checked the box 916 to override the user/employees request for revocation of the "createboportfolio" entitlement and provided an entitlement justification into the corresponding entry field 910.

Referring to FIGS. 15 and 16 bar graphs 1000 and 1100 are shown that illustrate the success of implementing the outlier determination and risk review assessment process of the present invention. Each letter across the x-axis 1002 represents a hierarchy within the entity/corporation. In FIG. 15, the y-axis 1004 represents the number of users/employees. The overall height of each bar represents the total number of users/employees in the hierarchy and, since, traditional access reviews encompassed all of the users/employees, also represents the total number of access reviews that would traditionally be performed. The cross-hatched patterned portion of each bar represents the number of user/associates determined to be outliers in accordance with the determination process herein described. Hence, the cross-hatched patterned portion of each bar represents the users/employees requiring access review based on implementation of the system herein described. In general, less than about twenty percent of the users/employees in any one hierarchy are determined to be outliers warranting access review.

In the bar graph 1100 of FIG. 16, the overall height of each bar represents the total number of entitlements in the hierarchy and since traditional access reviews encompassed all of the entitlements, the total height of the bar also represents the number of entitlements traditionally reviewed. The cross-hatch patterned portion of each bar represents the number entitlements requiring review based on implementation of the system herein described. In general, as illustrated in FIG. 17 and discussed infra., less than about five percent of the entitlements are outliers that warrant access review.

Referring to FIG. 17 a bubble chart is depicted that illustrates that the overall probability of an outlier is a function of the probabilities for the two identified community categories; specifically, hierarchy and job code, in accordance with embodiments of the present invention. Outlier probability calculations are designed to reduce false positives in the outlier detection process and to amplify outliers observed in both hierarchy and job code community categories. The overall probability of the outlier is a product of probabilities for the two community categories (i.e., hierarchy and job code), and the shaded area on the outlier plot represents overall probability greater than 68% of the entitlement being an outlier. The outlier plot shows that there is a clear separation between true outliers and some entitlements that seem unusual in one community category (e.g., job code), but shared by more than one associate in another community category (e.g., hierarchy), which significantly increases confidence level of the process.

Thus, present embodiments herein disclosed provide for a streamlined and efficient approach to risk entitlement reviews. The methods herein described limit the number of users/employees requiring reviews, the number of managers required to perform access entitlement reviews and number of individual entitlements required to be reviewed. In addition, by streamlining the process so that only those users/employees identified as outliers require access entitlement review, a greater completion rate is realized and a higher rate of entitlement revocations is realized.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for access entitlement review, the method comprising:
   determining, via a computing device processor, one or more entitlement review candidates from amongst a plurality of associates associated with an entity;
   providing, via a computing device processor, each of the entitlement review candidates and each manager assigned to each of the entitlement review candidates, access to a network-accessible viewable display of a listing of one or more access entitlements associated with the entitlement review candidate;
   receiving, via a computing device processor, from one or more of the entitlement review candidates, one or more revocation inputs, wherein each revocation input is associated with a corresponding access entitlement in the listing;
   receiving, via a computing device processor, from each of the managers assigned to the one or more entitlement review candidates, one or more revocation confirmation inputs, wherein each revocation confirmation input is associated with one of the revocation inputs received from the entitlement review candidate; and
   in response to receiving one of the revocation confirmation inputs, providing, via a computing device processor, for one of (1) automatic revocation of the corresponding access entitlement or (2) automatic communication of a revocation notification to a revocation facilitator assigned to conduct revocation of one or more access entitlements listed in the notification.

2. The method of claim 1, wherein providing the listing of the one or more access entitlements further comprises providing, via the computing device processor, the listing of the one or more access entitlements to an entitlement review facilitator.

3. The method of claim 2, wherein receiving further comprises receiving, via a computing device processor, from the entitlement review facilitator, the one or more revocation inputs.

4. The method of claim 1, wherein determining the one or more risk review candidates further comprises determining, via the computing device processor, one or more normalized risk scores for the plurality of associates and comparing, via a computing device processor, the normalized risk scores to predetermined normalized risk score thresholds, wherein each of the one or more normalized risk scores are associated with a risk category.

5. The method of claim 4, wherein determining the one or more normalized risk scores further comprises determining, via a computing device processor, community averages and community standard deviations for each community within two or more predetermined community categories based on one or more raw risk scores and determining, via the computing device processor, the one or more normalized risk scores based on the raw risk scores, the community averages and the community standard deviation.

6. The method of claim 4, wherein determining the one or more risk review candidates further comprises determining, via a computing device processor, one or more outlier reinforcement scores and comparing, via a computing device processor, the outlier reinforcement scores to predetermined outlier reinforcement score thresholds.

7. The method of claim 6, wherein determining the one or more outlier reinforcement scores further comprises summing, via a computing device processor, positive-valued normalized risk scores within a community to result in an overall community score and summing, via a computing device processor, the overall community scores from two or more community categories to result in the outlier reinforcement score.

8. An apparatus for access entitlement review, the apparatus comprising:
   a computing platform including a memory and at least processor in communication with the memory;
   an entitlement review candidate determining module stored in the memory, executable by the processor and configured to determine one or more entitlement review candidates from amongst a plurality of associates; and
   an access entitlement review module stored in the memory, executable by the processor and including,
      an access entitlement review application configured to (1) provide, each of the entitlement review candidates and each manager assigned to each of the entitlement review candidates, access to a network-accessible viewable display of the a listing of one or more access entitlements associated with the entitlement review candidate, (2) receive, from one or more of the entitlement review candidates, one or more revocation inputs, wherein each revocation input is associated with a corresponding access entitlement in the listing and (3) receive, from each of the managers assigned to the one or more entitlement review candidates, one or more revocation confirmation inputs, wherein each revocation confirmation input is associated with one of the revocation inputs received from the entitlement review candidate, and
      an access entitlement review queue configured to store revocations inputs and revocation confirmation inputs as at least part of review results for the entitlement review candidates.

9. The apparatus of claim 8, wherein the access entitlement review application is further configured to provide the listing of the one or more access entitlements to an entitlement review facilitator.

10. The apparatus of claim 9, wherein the access entitlement review application is further configured to receive, from the entitlement review facilitator, the one or more revocation inputs.

11. The apparatus of claim 8, further comprising an access entitlement revocation routine configured to, in response to receiving one of the revocation confirmation inputs provide for one of (1) automatic revocation of the corresponding access entitlement or (2) automatic communication of a revocation notification to a revocation facilitator assigned to conduct revocation of one or more access entitlements listed in the notification.

12. The apparatus of claim 8, wherein the entitlement review candidate determining module is further configured to determine one or more normalized risk scores for the plurality of employees and compare the normalized risk scores to predetermined normalized risk score thresholds to determine the entitlement review candidates, wherein each of the one or more normalized risk scores are associated with a risk category.

13. The apparatus of claim 12, wherein the entitlement review candidate determining module is further configured to determine community averages and community standard deviations for each community within two or more predetermined community categories based on one or more raw risk scores and determine the one or more normalized risk scores based on the raw risk scores, the community averages and the community standard deviation.

14. The apparatus of claim 12, wherein the entitlement review candidate determining module is further configured to determine one or more outlier reinforcement scores and compare the outlier reinforcement scores to predetermined outlier reinforcement score thresholds to determine the entitlement review candidates.

15. The apparatus of claim 14, wherein the entitlement review candidate determining module is further configured to sum positive-valued normalized risk scores within a community to result in an overall community score and sum the overall community scores from two or more community categories to result in the outlier reinforcement score.

16. A computer program product comprising:
a non-transitory computer-readable medium comprising:
- a first set of codes for causing a computer to determine one or more entitlement review candidates from amongst a plurality of associates associated with an entity;
- a second set of codes for causing a computer to provide, each of the entitlement review candidates and each manager assigned to each of the entitlement review candidates, access to a network-accessible viewable display of a listing of one or more access entitlements associated with the entitlement review candidate;
- a third set of codes for causing a computer to receive, from one or more of the entitlement review candidates, one or more revocation inputs, wherein each revocation input is associated with a corresponding access entitlement in the listing;
- a fourth set of codes for causing a computer to receive, from each of the managers assigned to the one or more entitlement review candidates, one or more revocation confirmation inputs, wherein each revocation confirmation input is associated with one of the revocation inputs received from the entitlement review candidate; and
- a fifth set of codes for causing a computer to provide, in response to receiving one of the revocation confirmation inputs, for one of (1) automatic revocation of the corresponding access entitlement or (2) automatic communication of a revocation notification to a revocation facilitator assigned to conduct revocation of one or more access entitlements listed in the notification.

17. The computer program product of claim 16, wherein the second set of codes is further configured to cause the computer to provide the listing of the one or more access entitlements to an entitlement review facilitator.

18. The computer program product of claim 17, wherein the third set of codes is further configured to cause the computer to receive, from the entitlement review facilitator, the one or more revocation inputs.

19. The computer program product of claim 16, wherein the first set of codes is further configured to cause the computer to determine one or more normalized risk scores for the plurality of employees and compare the normalized risk scores to predetermined normalized risk score thresholds, wherein each of the one or more normalized risk scores are associated with a risk category.

20. The computer program product of claim 19, wherein the first set of codes is further configured to cause the computer to determine community averages and community standard deviations for each community within two or more predetermined community categories based on one or more raw risk scores and determine the one or more normalized risk scores based on the raw risk scores, the community averages and the community standard deviation.

21. The computer program product of claim 19, wherein the first set of codes is further configured to cause the computer to determine one or more outlier reinforcement scores and compare the outlier reinforcement scores to predetermined outlier reinforcement score thresholds.

22. The computer program product of claim 21, wherein the first set of codes is further configured to cause the computer to sum positive-valued normalized risk scores within a community to result in an overall community score and sum the overall community scores from two or more community categories to result in the outlier reinforcement score.

\* \* \* \* \*